United States Patent
Zhou et al.

(10) Patent No.: US 12,105,870 B2
(45) Date of Patent: Oct. 1, 2024

(54) METHOD FOR CONTROLLING DISPLAY SCREEN ACCORDING TO EYE FOCUS AND HEAD-MOUNTED ELECTRONIC DEVICE

(71) Applicant: HUAWEI TECHNOLOGIES CO., LTD., Guangdong (CN)

(72) Inventors: Guoming Zhou, Shenzhen (CN); Jian Chen, Hangzhou (CN); Xu Zang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 399 days.

(21) Appl. No.: 17/295,699

(22) PCT Filed: Nov. 15, 2019

(86) PCT No.: PCT/CN2019/118623
§ 371 (c)(1),
(2) Date: May 20, 2021

(87) PCT Pub. No.: WO2020/103763
PCT Pub. Date: May 28, 2020

(65) Prior Publication Data
US 2022/0019282 A1    Jan. 20, 2022

(30) Foreign Application Priority Data
Nov. 23, 2018   (CN) .......................... 201811407510.5

(51) Int. Cl.
*G06F 1/32*      (2019.01)
*G02B 27/00*     (2006.01)
(Continued)

(52) U.S. Cl.
CPC ......... *G06F 3/013* (2013.01); *G02B 27/0093* (2013.01); *G02B 27/017* (2013.01);
(Continued)

(58) Field of Classification Search
None
See application file for complete search history.

(56) References Cited

U.S. PATENT DOCUMENTS 10,552,183 B2 *   2/2020   Gordon ............... G06F 3/04842
10,630,890 B2 *   4/2020   Chang ....................... G06T 7/55
(Continued)

FOREIGN PATENT DOCUMENTS

CN    202602831 U    12/2012
CN    103620527 A    3/2014
(Continued)

*Primary Examiner* — Danny Chan
(74) *Attorney, Agent, or Firm* — WOMBLE BOND DICKINSON (US) LLP

(57) ABSTRACT

A method for controlling a display screen according to an eye focus and a head-mounted electronic device are provided. The method is applicable to the head-mounted electronic device, the head-mounted electronic device includes a display screen, and the display screen is transparent when display is turned off. Furthermore, the method can include displaying an image on the display screen, an eye focus of a user being within a first distance range. The method can further include turning off the display screen, when it is detected that a duration in which the eye focus of the user is not within the first distance range is greater than or equal to a first duration. The method can lower power consumption, and reduce impact of an image on watching a real world.

20 Claims, 24 Drawing Sheets

---

101
Display an image on a display screen

102
Turn off the display screen, when it is detected that a duration in which an eye of a user is not within a first distance range is greater than or equal to a first duration

(51) Int. Cl.
  *G02B 27/01* (2006.01)
  *G06F 1/3231* (2019.01)
  *G06F 1/3234* (2019.01)
  *G06F 3/01* (2006.01)
  *G06F 3/16* (2006.01)

(52) U.S. Cl.
  CPC .......... *G06F 1/3231* (2013.01); *G06F 1/3265* (2013.01); *G06F 3/017* (2013.01); *G06F 3/167* (2013.01)

(56) References Cited

U.S. PATENT DOCUMENTS

| | | | | |
|---|---|---|---|---|
| 2012/0242570 | A1* | 9/2012 | Kobayashi | G02B 27/0093 345/156 |
| 2013/0021373 | A1* | 1/2013 | Vaught | G06F 3/013 345/633 |
| 2014/0078175 | A1 | 3/2014 | Forutanpour et al. | |
| 2015/0288788 | A1* | 10/2015 | Liu | H04W 4/02 455/414.1 |
| 2016/0025971 | A1* | 1/2016 | Crow | A61B 3/113 345/156 |
| 2016/0116979 | A1 | 4/2016 | Border | |
| 2016/0210407 | A1 | 7/2016 | Hwang et al. | |
| 2016/0246384 | A1* | 8/2016 | Mullins | G06F 3/017 |
| 2017/0269814 | A1* | 9/2017 | Kozloski | G06F 3/012 |
| 2017/0285735 | A1* | 10/2017 | Young | G06F 3/013 |
| 2017/0329398 | A1 | 11/2017 | Raffle et al. | |
| 2017/0345393 | A1* | 11/2017 | Wu | G06F 3/012 |
| 2018/0077409 | A1 | 3/2018 | Heo et al. | |
| 2018/0314066 | A1* | 11/2018 | Bell | G02B 27/0093 |
| 2018/0365875 | A1* | 12/2018 | Yildiz | G06V 40/193 |
| 2019/0011703 | A1* | 1/2019 | Robaina | A61B 90/36 |
| 2019/0311512 | A1* | 10/2019 | VanBlon | G02B 27/0179 |
| 2021/0191491 | A1* | 6/2021 | Thong | G06F 1/3206 |

FOREIGN PATENT DOCUMENTS

| | | |
|---|---|---|
| CN | 104598029 A | 5/2015 |
| CN | 104781853 A | 7/2015 |
| CN | 104850317 A | 8/2015 |
| CN | 105203028 A | 12/2015 |
| CN | 105204651 A | 12/2015 |
| CN | 105759959 A | 7/2016 |
| CN | 106412563 A | 2/2017 |
| CN | 207651151 U | 7/2018 |
| CN | 108595009 A | 9/2018 |
| CN | 109582141 A | 4/2019 |
| EP | 2093603 A1 | 8/2009 |

* cited by examiner

TO FIG. 4k-2

METHOD FOR CONTROLLING DISPLAY SCREEN ACCORDING TO EYE FOCUS AND HEAD-MOUNTED ELECTRONIC DEVICE

CROSS-REFERENCE TO RELATED APPLICATIONS

This application is a national stage application of International Application No. PCT/CN2019/118623, filed on Nov. 15, 2019, which claims priority to Chinese Patent Application No. 201811407510.5, filed on Nov. 23, 2018. Both of the aforementioned applications are hereby incorporated by reference in their entireties.

TECHNICAL FIELD

This application relates to the field of communication technologies, and in particular, to a method for controlling a display screen according to an eye focus, and a head-mounted electronic device.

BACKGROUND

Among head-mounted electronic devices, an augmented reality (AR) apparatus can display a virtual image for a user while the user is watching a scene in a real world. The user may also interact with the virtual image to implement an augmented reality effect.

At present, power consumption and heat dissipation are one of the technical bottlenecks of the head-mounted electronic device. Power consumption and heat dissipation of a display screen of the head-mounted electronic device are the main parts. Moreover, when a user wearing the head-mounted electronic device wants to watch the real world, an image displayed on the display screen of the head-mounted electronic device will affect the user to watch the real world. Especially when a background color of the image is bright color such as white, it is difficult for the user to see the real world behind the image clearly.

Therefore, how to reduce the power consumption and heat dissipation of the head-mounted electronic device, and enable the user to see the real world more clearly is an urgent problem to be solved.

SUMMARY

This application provides a method for controlling a display screen according to an eye focus and a head-mounted electronic device, to save power consumption and reduce impact of an image on watching a real world.

According to a first aspect, this application provides a method for controlling a display screen according to an eye focus, where the method is applicable to a head-mounted electronic device, the head-mounted electronic device includes a display screen, the display screen is transparent when display is turned off, and the method includes: displaying an image on the display screen, an eye focus of a user being within a first distance range; and turning off the display screen, when it is detected that a duration in which the eye focus of the user is not within the first distance range is greater than or equal to a first duration.

According to the foregoing method for controlling a display screen according to an eye focus, when the eye focus of the user is not in a fixed focus of the display screen, the display screen is turned off. The user may watch an entity object through the transparent display screen. In this way, impact of a displayed image on watching the real world by a user can be reduced. In addition, power consumption of the display screen can be reduced.

Optionally, the display screen may be turned off only when one or more of the following conditions occur: a. a processor invokes a focal length detection sensor to detect that a duration in which the eye focus of the user falls on the fixed focus of the display screen is less than a first threshold, where the first threshold may be, for example, one second; b. the processor invokes the focal length detection sensor to detect that a frequency at which the eye focus of the user is beyond the fixed focus of the display screen is greater than a second threshold, where the second threshold may be, for example, twice every minute; and c. the processor invokes the focal length detection sensor to detect that a duration in which the eye focus of the user moves away from the fixed focus of the display screen is greater than the first duration, where the first duration may be, for example, one minute.

In some embodiments, after the turning off the display screen, the method further includes: turning on the display screen, when it is detected that a duration in which the eye focus of the user falls within the first distance range is greater than or equal to a second duration.

When the eye focus of the user is within the fixed focus of the display screen, the display screen is turned on. In this way, operation convenience of the head-mounted electronic device can be improved.

Optionally, the display screen may be turned on only when one or more of the following conditions occur: a. the processor invokes the focal length detection sensor to detect that a duration in which the eye focus of the user falls on the fixed focus of the display screen is greater than the second duration, where the second duration may be, for example, one second; b. the processor invokes the focal length detection sensor to detect that a frequency at which the eye focus of the user falls on the fixed focus of the display screen is greater than twice every minute; c. the processor invokes the focal length detection sensor to detect that a duration in which the eye focus of the user falls near the fixed focus of the display screen is greater than one second; and d. the processor invokes the focal length detection sensor to detect that a duration in which the eye focus of the user falls outside the fixed focus of the display screen is less than one second.

In some embodiments, the display screen is a liquid crystal display screen, and when a video is played on the display screen, the turning off the display screen includes: turning off a backlight of the display screen.

When watching a video, if the user needs to watch an entity object, the video playing is paused, and the display of the display screen is turned off, thereby reducing power consumption and improving convenience for the user to watch the video. In addition, a display panel is turned off without turning off a screen driver integrated circuit (IC), and the screen driver IC does not need to be initialized when the video playing is restored, so that a response speed of playing restoring can be improved.

Playing the video on the display screen refers to that different images are refreshed and displayed on the display screen in a time sequence. Pausing the video playing refers to that an image displayed on the display screen does not change with the time, and an image displayed subsequently on the display screen is the image displayed when the video is paused.

Optionally, turning off the display screen may refer to turning off a first area on the display screen. Turning on the display screen may refer to turning on the first area on the display screen.

In this embodiment of this application, after a video image played on the display screen is paused, display of the first area is turned off, and images displayed in a display area other than the first area do not change until the display screen is restored to play the video.

The electronic device may further detect a depth of the eye focus of the user. The electronic device may further detect a viewing angle of the eye focus of the user, that is, a gaze direction of the eye. The first area of which the display is turned off on the display screen may be an area at which the eye gazes along a viewing direction on the display screen. The first area of which the display is turned off on the display screen may further be an area of a vertical projection of the eye on the display screen.

In some embodiments, when it is detected that the duration in which the eye focus of the user is not within the first distance range is greater than or equal to the first duration, the head-mounted electronic device may execute any one of the followings: reducing a brightness of the first area; turning off the display of the display screen; moving an area for image display on the display screen; and moving and narrowing the area for image display on the display screen.

In some embodiments, the display screen is a liquid crystal display screen, and when navigation information is displayed on the display screen, the turning off the display screen includes: turning off the backlight of the display screen and one or more of the followings: a display panel, a drive circuit of the backlight, and a drive circuit of the display screen.

In a navigation scenario, the backlight, the display panel, and the driver IC of the display screen may all be turned off to further reduce the power consumption.

In some embodiments, the display screen is an organic light emitting diode display screen, and when a video is played on the display screen, the turning off the display screen includes: turning off a display panel of the display screen.

When watching a video, if the user needs to watch an entity object, the video playing is paused, and the display of the display screen is turned off, thereby reducing power consumption and improving convenience for the user to watch the video. In addition, the display panel is turned off without turning off the screen driver IC, and the screen driver IC does not need to be initialized when the video playing is restored, so that a response speed of playing restoring can be improved.

In some embodiments, the display screen is an organic light emitting diode display screen, and when navigation information is displayed on the display screen, the turning off the display screen includes: turning off a drive circuit of the display screen and a display panel of the display screen.

In a navigation scenario, both the display panel and the driver IC may be turned off to further reduce the power consumption.

In some embodiments, the method further includes: turning off the display screen, when any one or more of the followings are detected: the duration in which the eye focus of the user is not within the first distance range being greater than or equal to the first duration; an operation of pressing a first key; a first gesture; and a first speech signal.

The first gesture may be, for example, one or more of the following gestures: a "v" gesture, a fist, a finger snap, or an OK gesture, and the like.

A correspondence between the first key and an instruction of turning off the display screen may be preset by a system, or may be set in response to a user operation. A correspondence between the first gesture and the instruction of turning off the display screen may also be preset by the system, or may be set in response to the user operation. A correspondence between the first speech signal and the instruction of turning off the display screen may be preset by the system, or may be set in response to the user operation.

In some embodiments, the method further includes: turning on the display screen, when any one or more of the followings are detected:

the duration in which the eye focus of the user falls within the first distance range being greater than or equal to the second duration; an operation of pressing a second key; a second gesture; and a second speech signal.

A correspondence between the second key and an instruction of turning on the display screen may be preset by the system, or may be set in response to a user operation. A correspondence between the second gesture and the instruction of turning on the display screen may also be preset by the system, or may be set in response to the user operation. A correspondence between the second speech signal and the instruction of turning on the display screen may be preset by the system, or may be set in response to the user operation.

The second gesture may be, for example, one or more of the following gestures: a "v" gesture, a fist, a finger snap, or an OK gesture, and the like.

The user operation may also be a touch operation on the display screen or a brainwave signal. The head-mounted electronic device may also turn on or turn off the display of the display screen when it is detected, by using a camera, that the eye is in a specific state, for example, the eye is upturned, downturned, or blinked quickly.

Optionally, when the navigation information is displayed on the display screen, the head-mounted electronic device may further detect, by using a speed sensor, that a moving speed exceeds a speed threshold, and turn off the display of the display screen, or may move the navigation information displayed on the display screen to a side of the display screen. The display screen is turned off when it is detected that the moving speed of the head-mounted electronic device is excessively high. Therefore, a case that the safety of the user affected by the image displaying of the display screen when the user moves too fast in a navigation scenario can be reduced, thereby providing convenience for the user.

Optionally, when the navigation information is displayed on the display screen, the head-mounted electronic device may further determine, according to a location of the device, that there is no intersection within a distance threshold range in a moving direction along a current travel route, for example, there is no intersection within one kilometer, then the head-mounted electronic device may turn off the display of the display screen. In the navigation scenario, when an intersection to which the user needs to pay attention is not approached, the display of the display screen is turned off, thereby reducing power consumption of the head-mounted electronic device, and reducing a case that a line of sight of the user being blocked by the displayed image on the display screen, providing convenience for the user.

Optionally, to reduce a quantity of times that the display screen is repeatedly turned off or turned on, the electronic device may turn off the display panel and the driver IC when it is detected that none of images of N consecutive entity objects on the display screen is focused by the eye. Then, the display screen and the driver IC are turned on only when one or more of the followings are detected, to display an image of an entity object in a current viewing angle of the electronic device: a. the eye focus being focused in the fixed focus of the display screen; b. response to a certain user operation; and c. M (an integer greater than 1) entity objects successively entering the viewing angle of the electronic device.

Optionally, the head-mounted electronic device may further acquire, through machine learning, a quantity of times or a probability of an image corresponding to a different entity object being historically focused by the user. The head-mounted electronic device may determine, according to a quantity of times or a probability of each type of entity objects being historically focused, a triggering condition for turning off the display screen. The larger the quantity of times or the probability is, the looser the triggering condition set for turning off the display screen for the entity object can be. For example, the smaller the value of the first threshold is, the larger the values of the second threshold and the first duration are.

According to the foregoing method, display content on the display screen preferred by the user is determined through machine learning, and then a condition for turning off the display screen is set according to the display content on the display screen preferred by the user. In addition to reducing the power consumption, whether the user needs to turn off the display screen can be determined more precisely.

Optionally, the head-mounted electronic device may acquire, through machine learning, a quantity of times or a frequency of an image corresponding to a different scenario being historically focused by the user. The head-mounted electronic device may determine, according to a quantity of times or a frequency of an entity object being historically focused in each scenario, a triggering condition for turning off the display screen. The larger the quantity of times or the frequency is, the looser the triggering condition set for turning off the display screen in the scenario can be. For example, the smaller the value of the first threshold is, the larger the values of the second threshold and the first duration are.

According to the foregoing method, a display scenario on the display screen preferred by the user is determined through machine learning, and then a condition for turning off the display screen is set according to the display scenario on the display screen preferred by the user. In addition to reducing the power consumption, whether the user needs to turn off the display screen can be determined more precisely.

According to a second aspect, this application provides another method for controlling a display screen according to an eye focus, where the method is applicable to a head-mounted electronic device, the head-mounted electronic device includes a display screen, the display screen is transparent when display is turned off, and the method includes: playing a video on the display screen, an eye focus of a user being within a first distance range; and turning off, when it is detected that a duration in which the eye focus of the user is not within the first distance range is greater than or equal to a first duration, a corresponding display area at a viewing angle at which the eye of the user focuses on a display panel, and pausing the video playing on the display screen.

According to the above method for controlling a display screen according to an eye focus, when it is detected that the eye focus of the user is not within the fixed focus of the display screen, for example, the corresponding display area at the viewing angle at which the eye of the user focuses on the display panel, the playing of the video on the display screen is paused. The user may watch an entity object through the transparent display screen that is turned off. In this way, impacts of a displayed image on watching the real world by the user can be reduced. In addition, the power consumption of the display screen can be reduced.

In some embodiments, after the turning off a corresponding display area at a viewing angle at which the eye of the user focuses on a display panel, the method further includes: turning on, when it is detected that the duration in which the eye focus of the user falls within the first distance range is greater than or equal to the second duration, the corresponding display area at the viewing angle at which the eye of the user focuses on the display panel, and starting to play the video on the display screen.

According to a third aspect, this application provides a head-mounted electronic device, including one or more processors and one or more memories, where the one or more memories are coupled to the one or more processors, the one or more memories are configured to store a computer program code, the computer program code includes computer instructions, and when the one or more processors execute the computer instructions, a terminal executes the method for controlling a display screen according to an eye focus according to the first aspect, the second aspect, any possible implementation of the first aspect, or any possible implementation of the second aspect.

According to a fourth aspect, this application provides a computer storage medium, including computer instructions, the computer instructions, when running on a terminal, causing the terminal to execute the method for controlling a display screen according to an eye focus according to the first aspect, the second aspect, any possible implementation of the first aspect, or any possible implementation of the second aspect.

According to the embodiments of this application, when the eye focus of the user is not in the fixed focus of the display screen, the display screen is turned off. The user may watch the entity object through the transparent display screen. In this way, impacts of a displayed image on watching the real world by the user can be reduced. In addition, the power consumption of the display screen can be reduced.

BRIEF DESCRIPTION OF DRAWINGS

The following describes the accompanying drawings used in the embodiments of this application.

FIG. 3-1 and FIG. 3-2 are a schematic diagram of some man-machine interactions in a navigation scenario according to an embodiment of this application;

FIG. 4*a* to FIG. 4*k*-2 are schematic diagrams of some man-machine interaction examples according to an embodiment of this application;

FIG. 5-1 and FIG. 5-2 are a schematic diagram of some man-machine interactions in a navigation scenario according to an embodiment of this application;

FIG. 6-1 and FIG. 6-2 are a schematic diagram of some other man-machine interactions in a navigation scenario according to an embodiment of this application;

DESCRIPTION OF EMBODIMENTS

The following describes the embodiments of this application with reference to the accompanying drawings in the embodiments of this application. Terms used in the implementations of the embodiments of this application are merely used to explain specific embodiments of this application, but are not intended to limit this application.

An electronic device related to the embodiments of this application is introduced. The electronic device may be a head-mounted electronic device. A user may wear the head-mounted electronic device to implement different effects such as virtual reality (VR), AR, mixed reality (MR), and the like. For example, the head-mounted electronic device may be a pair of spectacles, a head-mounted electronic device, a pair of goggles, or the like. The electronic device may also be another device including a display screen, for example, an autonomous vehicle including a display screen, or the like.

Figure 1:
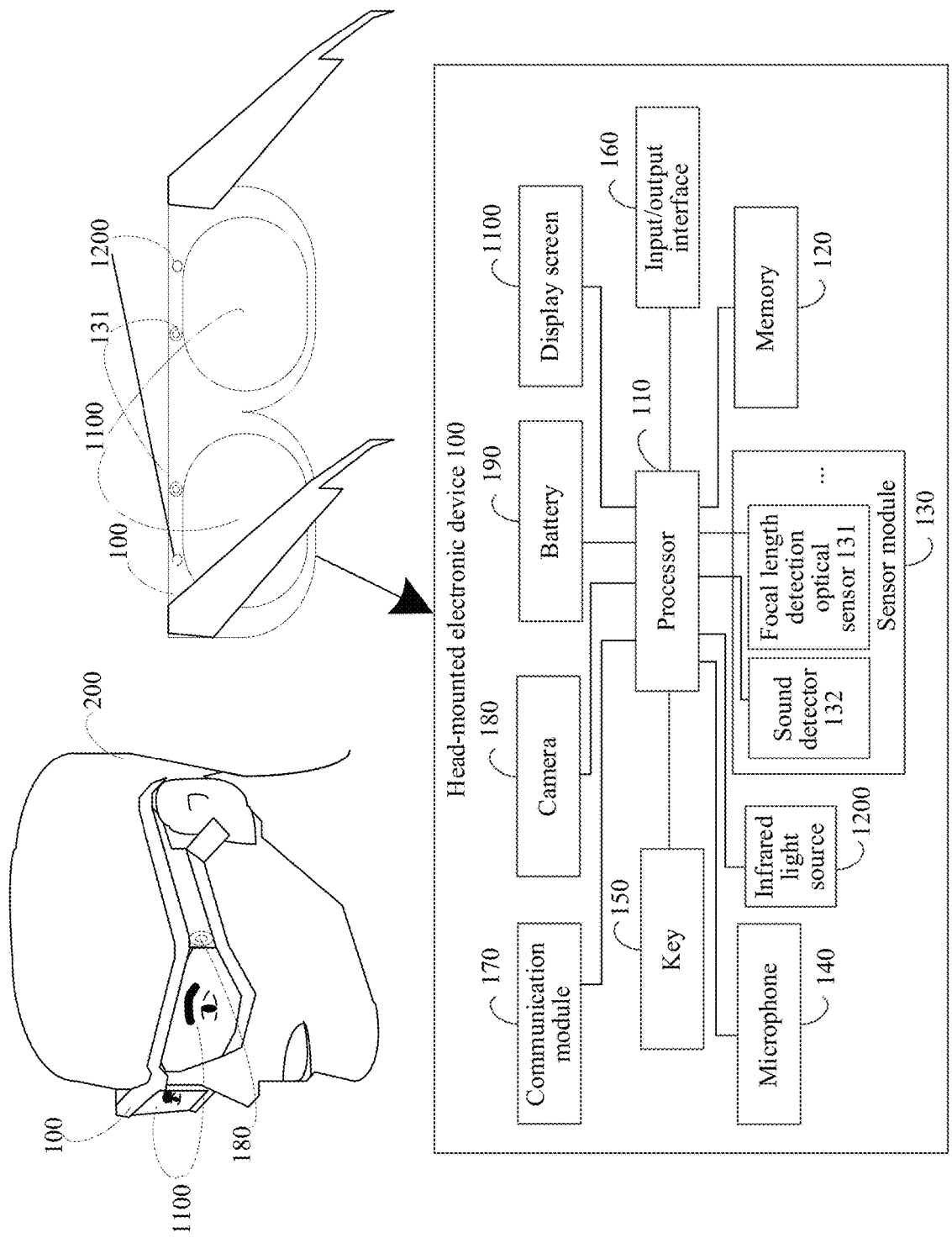
FIG. 1 is a schematic structural diagram of a head-mounted electronic device according to an embodiment of this application.

Refer to FIG. 1. FIG. 1 is a schematic structural diagram of a head-mounted electronic device according to an embodiment of this application. When the head-mounted electronic device is mounted on a head of a user, an image presented on a display screen of the head-mounted electronic device may be seen by eyes of the user. When the display screen is transparent, the eyes of the user may see an entity object through the display screen, or the eyes of the user may see images displayed by another display device through the display screen.

It may be understood that this embodiment of this application is described by using an example in which the electronic device is a head-mounted electronic device. However, this embodiment of this application is not limited to the head-mounted electronic device, and the electronic device may alternatively be another device.

As shown in FIG. 1, a head-mounted electronic device 100 may include a processor 110, a memory 120, a sensor module 130, a microphone 140, a key 150, an input/output interface 160, a communication module 170, a camera 180, a battery 190, a display screen 1100, and the like. The sensor module 130 may include a focal length detection optical sensor 181, and the focal length detection optical sensor 181 is configured to detect a focal length of an eye of a user 200. The sensor module 130 may further include another sensor, such as a sound detector, an optical proximity sensor, a distance sensor, a gyroscope sensor, an ambient light sensor, an acceleration sensor, a temperature sensor, or the like.

It may be understood that a structure shown in this embodiment of this application does not constitute a specific limitation on the head-mounted electronic device 100. In some other embodiments of this application, the head-mounted electronic device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a video processing unit (VPU) controller, a memory, a video codec, a digital signal processor (DSP), a baseband processor, and/or a neural-network processing unit (NPU), and the like. Different processing units may be independent components, or may be integrated into one or more processors.

The controller may be a nerve center and a command center of the head-mounted electronic device 100. The controller may generate an operating control signal according to an instruction operation code and a sequence signal, to complete control of fetching and executing an instruction.

A memory may be further disposed in the processor 110, and is configured to store instructions and data. In some embodiments, the memory in the processor 110 is a cache memory. The memory may store an instruction or data that has just been used or cyclically used by the processor 110. If the processor 110 needs to use the instruction or the data again, the processor 110 may directly invoke the instruction or the data from the memory, thereby avoiding repetitive access and reducing waiting time of the processor 110, so that system efficiency is improved.

In some embodiments, the processor 110 may include one or more interfaces. The interface may include an inter-integrated circuit (I2C) interface, a universal asynchronous receiver/transmitter (UART) interface, a mobile industry processor interface (MIPI), a general-purpose input/output (GPIO) interface, a subscriber identity module (SIM) interface, and/or a universal serial bus (USB) interface, a serial peripheral interface (SPI) interface, and the like.

The I2C interface is a bidirectional synchronous serial bus, including a serial data line (SDA) and a serial clock line (SCL). In some embodiments, the processor 110 may include a plurality of groups of I2C buses. The processor 110 may be separately coupled to the focal length detection optical sensor 131, the battery 190, the camera 180, and the like through different I2C bus interfaces. For example, the processor 110 may be coupled to the focal length detection optical sensor 131 through the I2C interface, so that the processor 110 communicates with the focal length detection optical sensor 131 through the I2C bus interface, to acquire a focal length of an eye of the user. The SPI interface may be used for connections between the processor and the sensor.

The UART interface is a universal serial data bus used for asynchronous communication. The bus may be a bidirectional communication bus, converting to-be-transmitted data between serial communication and parallel communication. In some embodiments, the UART interface is usually configured to connect the processor 110 to the communication module 170. For example, the processor 110 communicates with a Bluetooth module in the communication module 170 through the UART interface, to implement a Bluetooth function.

The MIPI interface may be configured to connect the processor 110 to peripheral devices such as the display screen 1100 and the camera 180. The MIPI interface includes a camera serial interface (CSI), a display serial interface (DSI), and the like. In some embodiments, the processor 110 communicates with the camera 180 through a CSI interface, to implement a photographing function of the head-mounted electronic device 100. The processor 110 communicates with the display screen 1100 through a DSI interface, to implement a display function of the head-mounted electronic device 100.

The GPIO interface may be configured through software. The GPIO interface may either be configured as a control signal or a data signal. In some embodiments, the GPIO interface may be configured to connect the processor 110 to the camera 180, the display screen 1100, the communication module 170, the sensor module 130, the microphone 140, and the like. The GPIO interface may also be configured as an I2C interface, an I2S interface, a UART interface, an MIPI interface, and the like.

The USB interface is an interface conforming to a USB standard specification, and may be specifically a Mini USB interface, a Micro USB interface, a USB Type-C interface, or the like. The USB interface may be configured to be connected to a charger to charge the head-mounted electronic device 100, or may be configured to transmit data between the head-mounted electronic device 100 and a peripheral device. The USB interface may also be connected to a headset to play audios through the headset. The interface may be further configured to be connected to another electronic device, for example, a mobile phone, or the like. The USB interface may be a USB 3.0, and is configured to be compatible with a high-speed display port (DP) for signal transmission, and may transmit high-speed audio and video data.

It may be understood that an interface connection relationship between the modules shown in this embodiment of this application is merely a schematic illustration, and does not constitute a structural limitation on the head-mounted electronic device 100. In some other embodiments of this application, the head-mounted electronic device 100 may alternatively use different interface connection manners or a combination of a plurality of interface connection manners in the foregoing embodiments.

In addition, the head-mounted electronic device 100 may include a wireless communication function. The communication module 170 may include a wireless communication module and a mobile communication module. The wireless communication function may be implemented by an antenna (not shown), a mobile communication module (not shown), a modem processor (not shown), a baseband processor (not shown), and the like.

The antenna is configured to transmit and receive electromagnetic wave signals. The head-mounted electronic device 100 may include a plurality of antennas, and each antenna may be configured to cover a single or a plurality of communication bands. Different antennas may also be multiplexed to improve utilization of the antennas. For example, an antenna 1 may be multiplexed as a diversity antenna of a wireless local area network. In some other embodiments, the antenna may be used in combination with a tuning switch.

The mobile communication module may provide solutions of wireless communications applied to the head-mounted electronic device 100, including 2G/3G/4G/5G, and the like. The mobile communication module may include at least one filter, a switch, a power amplifier, a low noise amplifier (LNA), and the like. The mobile communication module may receive an electromagnetic wave through an antenna, perform processing such as filtering and amplifying on the received electromagnetic wave, and transmit the received electromagnetic wave to a modem processor for demodulation. The mobile communication module may further amplify a signal modulated by the modem processor, and convert the signal into an electromagnetic wave through an antenna and radiate the electromagnetic wave. In some embodiments, at least some functional modules of the mobile communication module may be disposed in the processor 110. In some embodiments, at least some functional modules of the mobile communication module and at least some modules of the processor 110 may be disposed in a same device.

The modem processor may include a modulator and a demodulator. The modulator is configured to modulate a to-be-sent low-frequency baseband signal into a medium-high-frequency signal. The demodulator is configured to demodulate the received electromagnetic wave signal into a low-frequency baseband signal. Then, the demodulator transmits the demodulated low-frequency baseband signal to the baseband processor for processing. The low-frequency baseband signal is processed by the baseband processor and then transmitted to an application processor. The application processor outputs a sound signal through an audio device (not limited to a loudspeaker, or the like), or displays an image or a video through the display screen 1100. In some embodiments, the modem processor may be an independent device. In some other embodiments, the modem processor may be independent of the processor 110, and may be disposed in a same device with the mobile communication module or other functional modules.

The wireless communication module may provide solutions of wireless communications applied to the head-mounted electronic device 100, including a wireless local area network (WLAN) (such as a wireless fidelity (Wi-Fi) network) and Bluetooth (BT), a global navigation satellite system (GNSS), frequency modulation (FM), near field communication (NFC), and infrared (IR). The wireless communication module may be one or more devices integrating at least one communication processing module. The wireless communication module receives an electromagnetic wave through an antenna, performs frequency modulation and filtering processing on the electromagnetic wave signal, and sends the processed signal to the processor 110. The wireless communication module may further receive a to-be-sent signal from the processor 110, perform frequency modulation and amplification on the to-be-sent signal, and convert the signal into an electromagnetic wave through an antenna and radiate the signal.

In some embodiments, the antenna of the head-mounted electronic device 100 is coupled to the mobile communication module, so that the head-mounted electronic device 100 may communicate with a network and other devices through a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, GNSS, WLAN, NFC, FM, and/or IR technologies, and the like. The GNSS may include a global positioning system (GPS), a global navigation satellite system (GLONASS), a Beidou navigation satellite system (BDS), a quasi-zenith satellite system (QZSS) and/or satellite-based augmentation systems (SBAS).

The head-mounted electronic device 100 implements a display function through the GPU, the display screen 1100, the application processor, and the like. The GPU is a microprocessor for image processing, and is connected to the display screen 1100 and the application processor. The GPU is configured to perform mathematical and geometric calculations and to render graphics. The processor 110 may include one or more GPUs and execute program instructions to generate or change display information.

There may be two display screens 1100 in the head-mounted electronic device 100. The two display screens 1100 respectively correspond to two eyes of the user 200.

Content displayed on the two display screens may be displayed independently. Different images can be displayed on the two display screens to improve a three-dimensional effect of an image. In some possible embodiments, there may also be one display screen 1100 in the head-mounted electronic device 100, to correspond to the two eyes of the user 200.

The head-mounted electronic device 100 may implement a photographing function through the ISP, the camera 180, the video codec, the GPU, the display screen 1100, the application processor, and the like.

The ISP is used to process data fed back by the camera 180. For example, during photographing, a shutter is enabled. Light is transferred to a photosensitive element of the camera through a lens, and an optical signal is converted into an electrical signal. The photosensitive element of the camera transfers the electrical signal to the ISP for processing, and therefore, the electrical signal is converted into an image visible to a naked eye. The ISP may also optimize noise point, brightness, and skin tone algorithms. The ISP may also optimize parameters such as exposure and color temperature of a shooting scene. In some embodiments, the ISP may be disposed in the camera 180.

The camera 180 is configured to capture a static image or a video. An optical image of an object is generated through a lens and is projected to the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in RGB and YUV formats. In some embodiments, the head-mounted electronic device 100 may include one or N cameras 180, where N is a positive integer greater than 1.

As shown in FIG. 1, the camera 180 may be installed on a side of the head-mounted electronic device 100, or may be installed at a position between the two display screens on the head-mounted electronic device 100. The camera 180 is configured to capture an image and a video in a view of the user 200 in real time. The head-mounted electronic device 100 generates a virtual image according to a captured real-time image and a captured real-time video, and displays the virtual image through the display screen 1100.

The processor 110 may determine, according to a static image or a video image captured by the camera 180 and in combination with data (for example, data such as brightness and sound) acquired by the sensor module 130, a virtual image displayed on the display screen 1100, to superpose the virtual image on a real world object.

The digital signal processor is configured to process a digital signal. In addition to processing a digital image signal, the digital signal processor may also process other digital signals. For example, when the head-mounted electronic device 100 performs frequency selection, the digital signal processor is configured to perform Fourier transform on frequency energy.

The video codec is configured to compress or decompress a digital video. The head-mounted electronic device 100 may support one or more video codecs. In this way, the head-mounted electronic device 100 may play or record videos in a plurality of encoding formats, for example, moving picture experts group (moving picture experts group, MPEG) 1, MPEG 2, MPEG 3, MPEG 4, or the like.

The NPU is a neural-network (NN) computing processor, quickly processes input information by referring to a structure of a biological neural network, for example, a transmission mode between neurons in a human brain, and may further continuously perform self-learning. Applications such as intelligent cognition of the head-mounted electronic device 100 may be implemented by using the NPU, for example, image recognition, facial recognition, voice recognition, and text understanding.

The memory 120 may be configured to store a computer executable program code, where the executable program code includes an instruction. The processor 110 executes various function applications and data processing of the head-mounted electronic device 100 by running the instruction stored in the memory 120. The memory 120 may include a program storage area and a data storage area. The program storage area may store an operating system, an application required by at least one function (for example, a sound playing function or an image playing function), and the like. The data storage area may store data (for example, audio data or a telephone book) created during use of the head-mounted electronic device 100. In addition, the memory 120 may include a high-speed random access memory, and may also include a non-volatile memory, for example, at least one magnetic disk storage device, a flash memory device, or a universal flash storage (UFS), and the like.

The head-mounted electronic device 100 may implement an audio function through an audio module, a loudspeaker, the microphone 140, a headset jack, the application processor, for example, music playing, recording, and the like.

The audio module is configured to convert digital audio information into an analog audio signal for output, and is also configured to convert an analog audio input into a digital audio signal. The audio module may be further configured to encode and decode an audio signal. In some embodiments, the audio module may be disposed in the processor 110, or some functional modules of the audio module may be disposed in the processor 110.

The loudspeaker, also known as a "horn", is configured to convert an audio electrical signal into a sound signal. The head-mounted electronic device 100 may listen to music or listen to a hands-free call through the loudspeaker.

The microphone 140, also referred to as a "voice tube" or a "mike", is configured to convert a sound signal into an electrical signal. The head-mounted electronic device 100 may be provided with at least one microphone 140. In some other embodiments, the head-mounted electronic device 100 may be provided with two microphones 140 to collect a sound signal, and further implement a noise reduction function. In some other embodiments, the head-mounted electronic device 100 may further be provided with three, four, or more microphones 140, to implement sound signal collection and noise reduction, and further identify a sound source, and implement a directional recording function, and the like.

In some embodiments, the head-mounted electronic device 100 may include a sound detector 132. The sound detector 132 may detect and process a speech signal used to control a portable electronic device. For example, the sound detector may include the microphone 140. The head-mounted electronic device 100 may convert a sound into an electrical signal by using the microphone 140. The sound detector 132 may then process the electrical signal and recognize the signal as a command of a head-mounted display system 1300. The processor 110 may be configured to receive a speech signal from the microphone 140. After receiving the speech signal, the processor 110 may run the sound detector 132 to recognize a speech command. For example, when receiving a speech instruction, the head-mounted electronic device 110 may acquire a contact in a stored user contact list, and the head-mounted electronic device 100 may automatically dial a telephone number of the contact.

The headset jack is configured to be connected to a wired earphone. The headset jack may be a USB interface, or may be a 3.5 mm open mobile head-mounted electronic device platform (OMTP) standard interface, or a standard interface of Cellular Telecommunications Industry Association of the USA (CTIA).

In some embodiments, the head-mounted electronic device 100 may include one or more keys 150. These keys may control the head-mounted electronic device, and provide a function of accessing the head-mounted electronic device 100 for the user. The key 150 may be in a form of a button, a switch, a dial, and a touch or near-touch sensing device (such as a touch sensor). Specifically, for example, the user 20 may turn on the display screen 1100 of the head-mounted electronic device 100 by pressing a button. The key 190 includes a power key, a volume key, and the like. The key 190 may be a mechanical key, or a touch-type key. The head-mounted electronic device 100 may receive key input, and generate key signal input related to user settings and function control of the head-mounted electronic device 100.

In some embodiments, the head-mounted electronic device 100 may include the input/output interface 160, and the input/output interface 160 may connect other apparatus to the head-mounted electronic device 100 through a suitable component. The component may include, for example, an audio/video jack, a data connector, and the like.

The sound detector may detect and process a speech signal for controlling a portable electronic device.

In some embodiments, the head-mounted electronic device 100 may implement eye tracking. Specifically, an infrared device (for example, an infrared emitter) and an image acquisition device (for example, a camera) may be configured to detect an eye gaze direction.

The optical proximity sensor may include, for example, a light emitting diode (LED) and an optical detector, for example, a photodiode. The light emitting diode may be an infrared light emitting diode. The head-mounted electronic device 100 emits infrared light outwards through the light emitting diode. The head-mounted electronic device 100 uses a photodiode to detect infrared reflected light from a nearby object. When sufficient reflected light is detected, the head-mounted electronic device 100 may determine that there is an object near the head-mounted electronic device 100. When insufficient reflected light is detected, the head-mounted electronic device 100 may determine that there is no object near the head-mounted electronic device 100. The head-mounted electronic device 100 may detect a gesture operation at a specific position of the head-mounted electronic device 100 by using the optical proximity sensor, so as to implement an objective of associating the gesture operation with an operation command.

The distance sensor is configured to measure a distance. The head-mounted electronic device 100 may measure a distance through infrared or laser. In some embodiments, the head-mounted electronic device 100 may use the distance sensor to perform ranging to implement fast focusing.

The gyroscope sensor may be configured to determine a motion posture of the head-mounted electronic device 100. In some embodiments, an angular velocity of the head-mounted electronic device 100 around three axes (for example, x, y, and z axes) may be determined through the gyroscope sensor. The gyroscope sensor may also be used in navigation and motion sensing games.

The ambient light sensor is configured to sense a brightness of ambient light. The head-mounted electronic device 100 may adaptively adjust a luminance of the display screen 1100 according to perceived brightness of the ambient light. The ambient light sensor may also be configured to automatically adjust white balance during photographing.

The acceleration sensor may detect an acceleration value of the head-mounted electronic device 100 in each direction (generally three axes). When the head-mounted electronic device 100 is stationary, a magnitude and a direction of a gravity may be detected. The acceleration sensor may be further configured to recognize a posture of the head-mounted electronic device, and is applied to an application such as a pedometer.

The temperature sensor is configured to detect temperature. In some embodiments, the head-mounted electronic device 100 executes a temperature processing policy by using temperature detected by the temperature sensor. For example, when the temperature reported by the temperature sensor exceeds a threshold, the head-mounted electronic device 100 reduces performance of a processor located near the temperature sensor, so as to reduce power consumption and implement thermal protection. In some other embodiments, when the temperature is lower than another threshold, the head-mounted electronic device 100 heats the battery 190, to avoid abnormal power-off of the head-mounted electronic device 100 caused by low temperature. In some other embodiments, when the temperature is lower than still another threshold, the head-mounted electronic device 100 boosts an output voltage of the battery 190, to avoid abnormal power-off caused by low temperature.

The focal length detection optical sensor 131 is configured to detect a focal length of an eye of the user 200. In some embodiments, as shown in FIG. 1, the head-mounted electronic device 100 may further include an infrared light source 1200. The focal length detection optical sensor 131 may cooperate with the infrared light source 1200 to detect the focal length of the eye of the user 200.

As shown in FIG. 1, the focal length detection optical sensor 131 and the infrared light source 1200 may be disposed on a side of the display screen close to the eye. There may be two focal length detection optical sensors 131 and two infrared light sources 1200. Each eye may correspond to one focal length detection optical sensor 131 and one infrared light source 1200, to detect the focal length of the eye.

It may be understood that positions and quantities of the focal length detection optical sensor 131, the infrared light source 1200, and the camera 180 on the head-mounted electronic device 100 shown in FIG. 1 are merely used to explain this embodiment of this application, and should not constitute a limitation. There may also be one focal length detection optical sensor 131 and one infrared light source 1200. The one focal length detection optical sensors 131 and the one infrared light source 1200 may be used to detect a focal length of one eye, or to detect focal lengths of two eyes at the same time.

Figure 2:
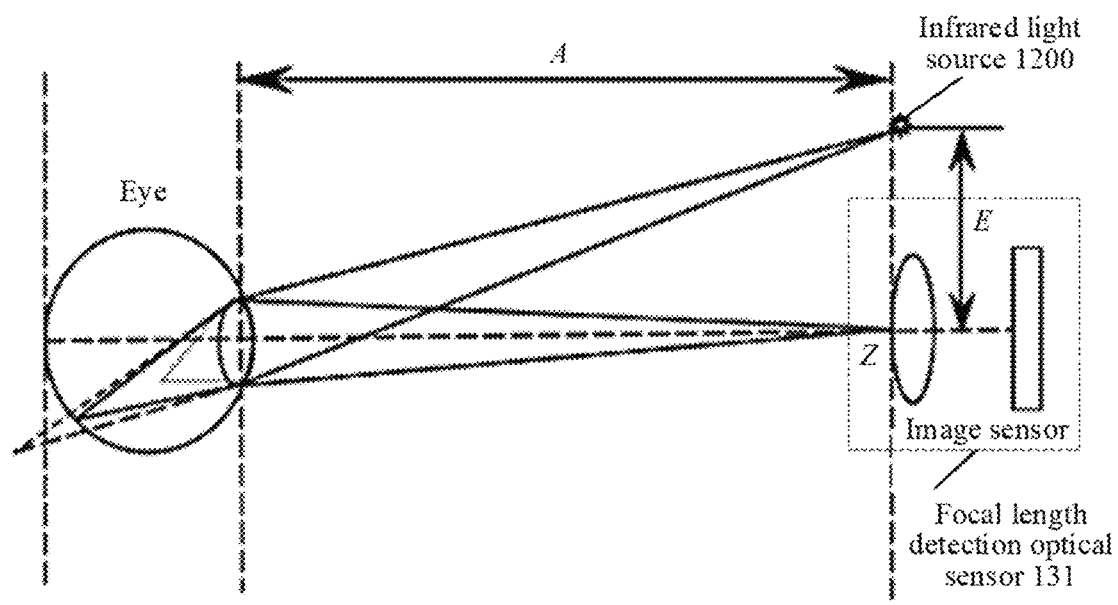
FIG. 2 is a schematic principle diagram of measuring a focal length of an eye in a head-mounted electronic device according to an embodiment of this application.

The following describes a specific principle of measuring a focal length of an eye of a user with reference to FIG. 2. Refer to FIG. 2. FIG. 2 is a schematic principle diagram of measuring a focal length of an eye in a head-mounted electronic device according to an embodiment of this application. As shown in FIG. 2, an infrared light source 1200, an eye, and a focal length detection optical sensor 131 form an optical system. The focal length detection optical sensor 131 may include a slit aperture Z and an image sensor (for example, a CCD or a CMOS). As shown in FIG. 2, the infrared light source 1200 may periodically emit infrared light. The infrared light is projected into the eye, and the eye reflects the infrared light. Refractive states of the eyes are different, and the reflected light passes through the aperture Z to form different shapes of eye images on an imaging plane. The eye image may be a round spot including bright and dark parts. The focal length or a diopter (diopter=1/focal length) of the eye corresponds to a bright and dark range of the eye image. The greater the diopter of the eye is, the greater a proportion between the bright part and the dark part of the eye image is. According to the foregoing principle, the focal length detection optical sensor 131 may detect a bright area size of the eye image, and then calculate the diopter and the focal length of the eye according to the bright area size. A relationship between the bright area size and the focal length may be determined by the following data in the optical system: a distance A from a principal plane of an eye to a principal plane of the focal length detection optical sensor 131, a radius of the eye, and an eccentric distance E from a center of the infrared light source to an edge of the aperture.

As shown in FIG. 1, the focal length detection optical sensor 131 may be located at an edge of the head-mounted electronic device 100. In other words, an optical axis of the focal length detection optical sensor 131 does not overlap an optical axis where the eye locates, and then the relationship between the bright area size and the focal length may be compensated according to positions of the focal length detection optical sensor 131 and the eye.

It may be understood that the above description to the principle of measuring a focal length of an eye is merely used to explain this embodiment of this application, and should not constitute a limitation. Other methods may be used for measuring the focal length of the eye in this embodiment of this application.

The display screen 1100 is configured to display an image, a video, and the like. The display screen 1100 includes a display panel. The display panel may be a liquid crystal display (LCD), an organic light-emitting diode (OLED), an active-matrix organic light emitting diode (AMOLED), a flexible light-emitting diode (FLED), a Miniled, a MicroLed, a Micro-oLed, quantum dot light emitting diodes (QLED), and the like.

To reduce power consumption of an electronic device and reduce impacts of an image displayed on a display screen on watching a real world by a user, this embodiment of this application provides an electronic device and a display method for the electronic device. The following describes several examples provided in this embodiment of this application.

Figures 1, 3:
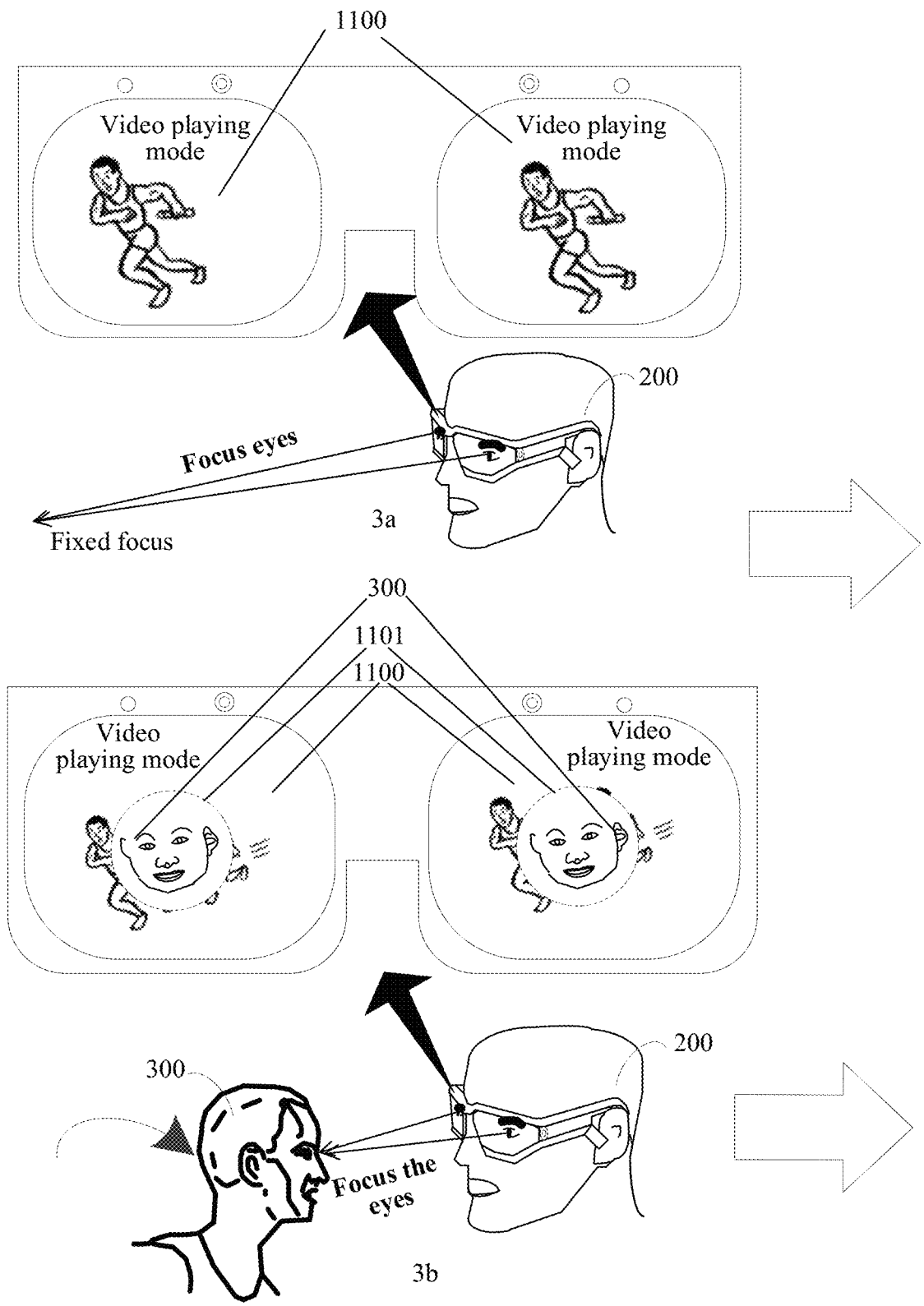
Figures 2, 3:
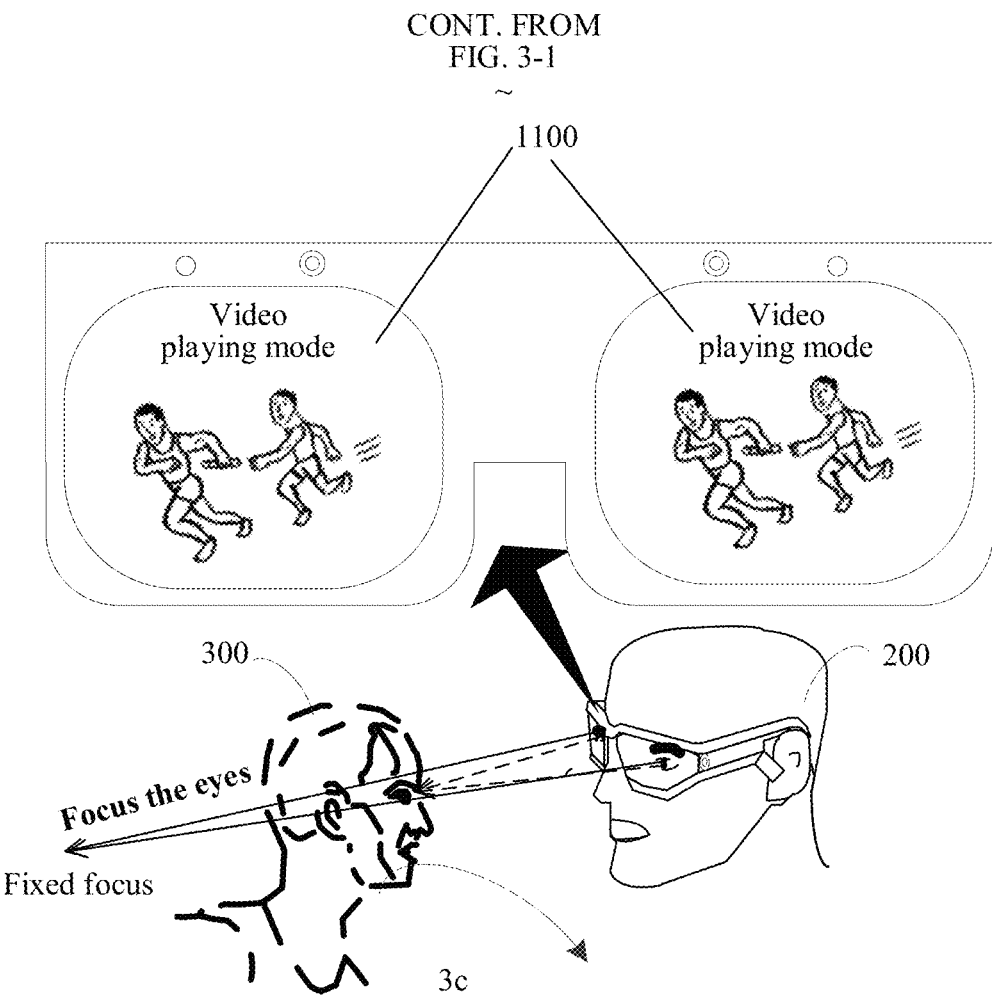

The following describes a scenario: a user 200 wears AR glasses and watch a virtual image displayed on a display screen of the AR glasses. For example, the user 200 is watching a video through the AR glasses. Refer to FIG. 3-1 and FIG. 3-2. FIG. 3-1 and FIG. 3-2 are a schematic diagram of some man-machine interaction examples according to an embodiment of this application.

As shown in FIG. 3a in FIG. 3-1 and FIG. 3-2, an electronic device 100 may be set in a video playing mode. In the video playing mode, a display screen 1100 of the electronic device 100 displays a video segment. The user 200 may focus an eye on a fixed focus of the display screen 1100 to see a clear image. The fixed focus may be, for example, a position two meters in front of the eye of the user 200. The fixed focus may also be within a distance range in front of the eye of the user 200, for example, may be a position two to four meters in front of the eye of the user 200. The distance range is a first distance range.

There may be a scenario in which the user 200 needs to watch an entity object outside a display image of the display screen 1100. For example, as shown in FIG. 3b in FIG. 3-1 and FIG. 3-2, when the user 200 needs to observe an entity object 300, the user 200 may focus the eye on the entity object 300.

As shown in FIG. 3b in FIG. 3-1 and FIG. 3-2, when a focal length detection sensor in the electronic device 100 detects that the eye focus of the user 200 is beyond the fixed focus of the display screen 1100, for example, detects that the eye focus of the user 200 is focused to a position of the entity object 300 which is 0.5 meter in front of the eye of the user 200, the electronic device 100 may turn off the display in a first area 1101 on the display screen 1100. The first area 1101 in which the display turned off is transparent. The user 200 may watch the entity object 300 through the first area 1101.

Optionally, when a processor in the electronic device 100 detects, through the focal length detection sensor, that the eye focus of the user 200 is beyond the fixed focus of the display screen 1100, the electronic device 100 may further pause a video image played on the display screen. When pausing the video image played on the display screen, the electronic device 100 may also pause playing an audio corresponding to the video.

Playing the video on the display screen refers to that different images are refreshed and displayed on the display screen in a time sequence. Pausing the video playing refers to that an image displayed on the display screen does not change with the time, and an image displayed subsequently on the display screen is the image displayed when the video is paused. In this embodiment of this application, after the video image played on the display screen is paused, the display of the first area 1101 is turned off, and images displayed in a display area other than the first area 1101 do not change until the display screen is restored to play the video.

When the display screen 1100 is an OLED display screen, the display of the first area 1101 may be turned off by turning off power supply to a pixel in the first area on an OLED display panel through a processor. For the description of cutting off the power supply to the pixel, reference may be made to a subsequent detailed description of an embodiment shown in FIG. 8. Details are not described herein again.

In addition, the processor in the electronic device 100 may determine, through one or more of the following conditions, that the eye focus of the user 200 is beyond the fixed focus of the display screen 1100: a. the processor invokes the focal length detection sensor to detect that a duration in which the eye focus of the user 200 falls on the fixed focus of the display screen 1100 is less than a first threshold, where the first threshold may be, for example, one second; b. the processor invokes the focal length detection sensor to detect that a frequency at which the eye focus of the user 200 is beyond the fixed focus of the display screen 1100 is greater than a second threshold, where the second threshold may be, for example, twice every minute; and c. the processor invokes the focal length detection sensor to detect that a duration in which the eye focus of the user 200 moves away from the fixed focus of the display screen 1100 is greater than a first duration, where the first duration may be, for example, one minute.

As shown in FIG. 3c in FIG. 3-1 and FIG. 3-2, after the processor of the electronic device 100 turns off the display of the first area 1101 on the display screen 1100, when the processor in the electronic device 100 detects that the eye focus of the user 200 returns to the fixed focus of the display screen 1100, the electronic device 100 may restore the display of the first area 1101. When the display screen 1100 is an OLED display screen, restoring the display of the first area 1101 on the display screen 1100 may be implemented by restoring the power supply to the pixel in the first area on the OLED display panel through the processor. For the description of restoring the power supply to the pixel, reference may be made to the subsequent detailed description of the embodiment shown in FIG. 8. Details are not described herein again.

In this embodiment of this application, an image displayed in the first area 1101 on the display screen 1100 after the display of the first area 1101 is restored may be the same as an image displayed in the first area 1101 when the display is turned off in FIG. 3c in FIG. 3-1 and FIG. 3-2.

Optionally, after the electronic device 10 pauses the video image played on the display screen, when the processor in the electronic device 100 determines that the eye focus of the user 200 returns to the fixed focus of the display screen 1100, the electronic device 100 may resume the playing of the video image.

The processor in the electronic device 100 may determine, through one or more of the following conditions, that the eye focus of the user 200 returns to the fixed focus of the display screen 1100: a. the processor invokes the focal length detection sensor to detect that a duration in which the eye focus of the user 200 falls on the fixed focus of the display screen 1100 is greater than a second duration, where the second duration may be, for example, one second; b. the processor invokes the focal length detection sensor to detect that a frequency at which the eye focus of the user 200 falls on the fixed focus of the display screen 1100 is greater than twice every minute; c. the processor invokes the focal length detection sensor to detect that a duration in which the eye focus of the user 200 falls at a position near the fixed focus of the display screen 1100 is greater than one second; and d. the processor invokes the focal length detection sensor to detect that a duration in which the eye focus of the user 200 falls outside the fixed focus of the display screen 1100 is less than one second.

For the foregoing condition c, for example, when the fixed focus of the display screen 1100 is at a position in a range of two to four meters in front of the eye of the user 200, the position near the fixed focus may be a position located in a range of one to five meters in front of the eye of the user 200.

The second duration may be equal to or different from the first duration.

In this embodiment of this application, in the schematic diagram of a man-machine interaction shown in FIG. 3-1 and FIG. 3-2, in addition to detecting the eye focus of the user, the electronic device 100 may further detect a depth of the eye focus of the user. The electronic device 100 may further detect a viewing angle of the eye focus of the user, that is, a gaze direction of the eye. The first area 1101 of which the display is turned off on the display screen 1100 may be an area at which the eye gazes along a viewing direction on the display screen. The first area 1101 of which the display is turned off on the display screen 1100 may further be an area of a projection of the eye on the display screen.

In the display method for the electronic device, when an image is displayed on the display screen, the display of the first area on the display screen is turned off when the processor detects that the eye focus of the user 200 is not within the fixed focus of the display screen 1100. The user may watch an entity object through the transparent first area. In this way, impacts of a displayed image on watching the real world by the user can be reduced. When watching a video, if the user needs to watch an entity object, the video playing is paused, and the display of the first area on the display screen is turned off, thereby reducing power consumption and improving convenience for the user to watch the video. In addition, the display panel is turned off without turning off the screen driver IC, and the screen driver IC does not need to be initialized when the video playing is restored, so that a response speed of playing restoring can be improved.

Optionally, when the focal length detection sensor in the electronic device 100 detects that the eye focus of the user 200 is beyond the fixed focus of the display screen 1100, the processor of the electronic device 100 may reduce a brightness of the first area or turn off the display of the display screen. The processor of the electronic device 100 may further move or narrow an area for image display on the display screen. Refer to FIG. 4a to FIG. 4d. FIG. 4a to FIG. 4d are schematic diagrams of some man-machine interaction examples provided by an embodiment of this application.

(I) Reduce a Brightness of a First Area

Figure 4A:
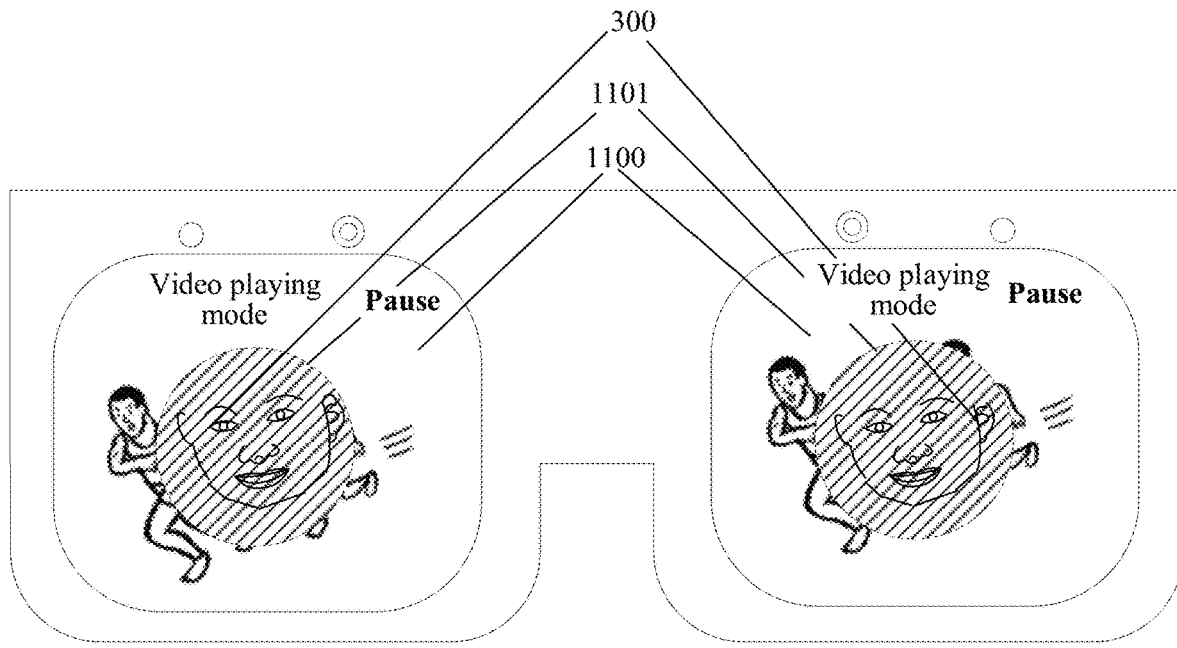

As shown in FIG. 4a, when the focal length detection sensor in the electronic device 100 detects that the eye focus of the user 200 is beyond the fixed focus of the display screen 1100, the processor of the electronic device 100 may reduce the brightness of the first area 1101. The user 200 may watch an entity object 300 through the transparent first area 1101, so that impacts of a displayed image on watching a real world by a user can be reduced. In addition, only the brightness of the first area 1101 is reduced, a screen driver IC and a display panel do not need to be turned off, and the screen driver IC and the display panel do not need to be initialized when video playing is restored, so that a response speed of playing restoring can be improved.

(II) Turn Off the Display of the Display Screen

Figure 4B:
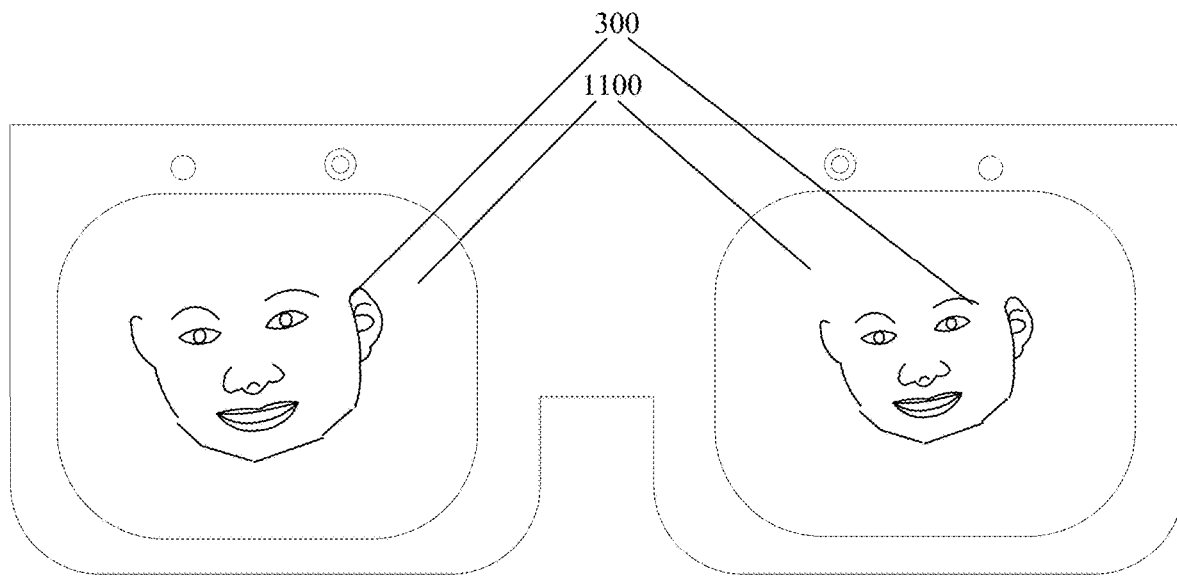

As shown in FIG. 4b, when the focal length detection sensor in the electronic device 100 detects that the eye focus of the user 200 is beyond the fixed focus of the display screen 1100, the processor of the electronic device 100 may turn off the display of the display screen. The display screen may be an LCD display screen or an OLED display screen. After the display is turned off, the display screen is transparent, and the user 200 may watch the entity object 300 through the transparent display screen, so that impacts of a displayed image on watching the entity object 300 by the user can be reduced. Turning off the entire display screen can further reduce the power consumption.

(III) Move an Area for Image Display on the Display Screen

Figure 4C:
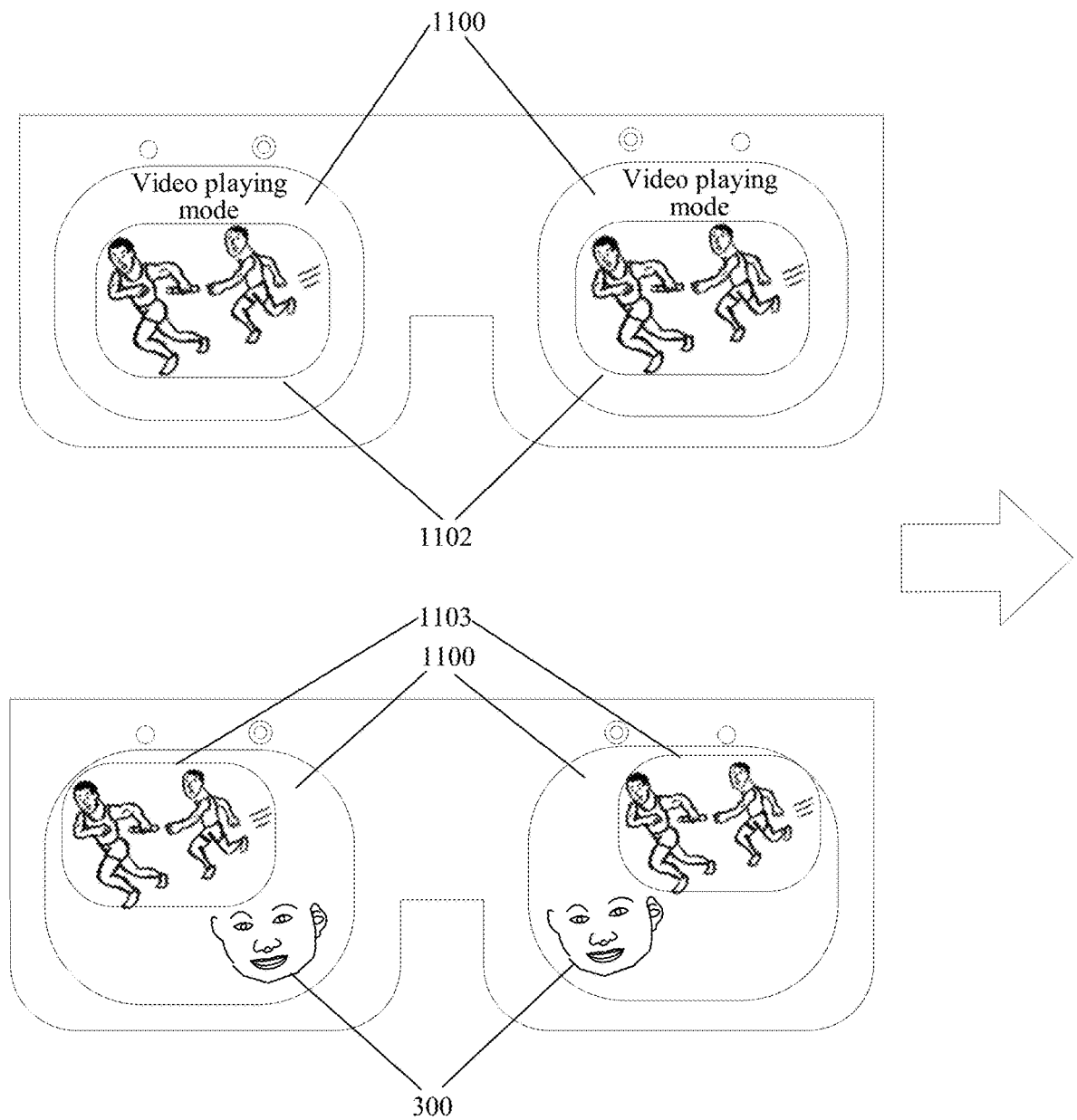

As shown in FIG. 4c, the processor may invoke a display area 1102 on the display screen 1100 to display, and the area other than the area 1102 for image display on the display screen is turned off, and is in a transparent state. When the focal length detection sensor in the electronic device 100 detects that the eye focus of the user 200 is beyond the fixed focus of the display screen 1100, the processor of the electronic device 100 may switch the area for image display from the area 1102 to an area 1103. As shown in FIG. 4c, the area 1103 for image display may be avoided from an area of a projection of the eye at a viewing angle at which the eye focuses on the display screen, so that the eye can watch the entity object 300 through the area on the display screen other than the area for image display. Optionally, the processor may switch the area for image display to a position deviating from a center of the display screen, and reserve a transparent area for the eye of the user to watch the entity object 300.

When the processor of the electronic device 100 detects that the eye focus of the user 200 returns to the fixed focus of the display screen 1100, the processor of the electronic device 100 may switch the area for image display to a central area of the display screen, or use the entire area of the display screen to display the image.

Moving the area for image display on the display screen to an area beyond the area of a projection of the eye at a viewing angle at which the eye focuses on the display screen can reduce impacts of a displayed image on watching the entity object 300 by the user, and improve a response speed when the display of the display screen is restored.

(IV) Move and Narrow the Area for Image Display on the Display Screen

Figure 4D:
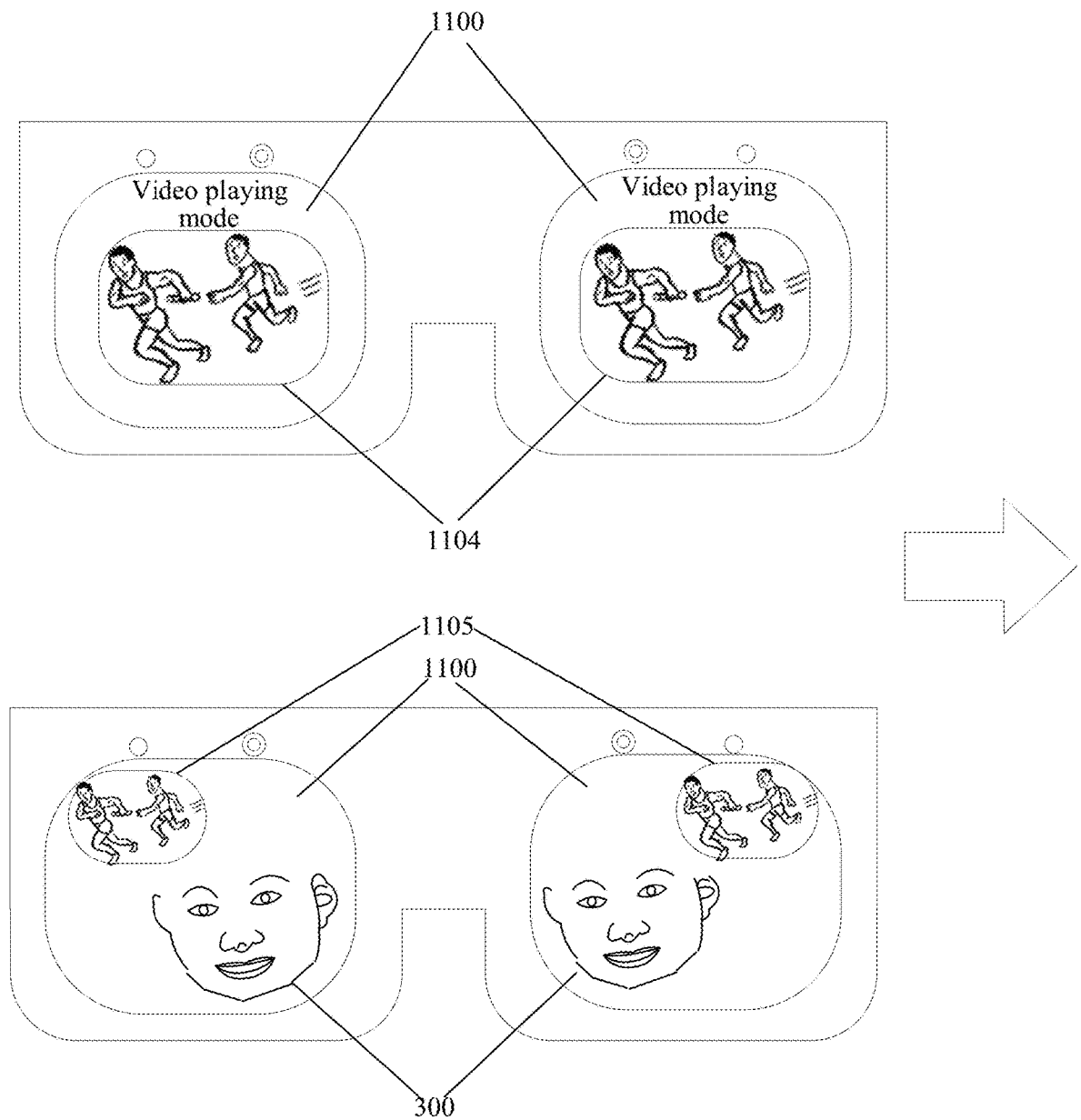

As shown in FIG. 4d, when the focal length detection sensor in the electronic device 100 detects that the eye focus of the user 200 is beyond the fixed focus of the display screen 1100, the processor of the electronic device 100 may switch the area for image display from an area 1104 to an area 1105. In addition, a quantity of pixels of the area 1105 after switching is less than that of the area 1104, to reserve a larger transparent area of the display screen for the eye of the user. As shown in FIG. 4d, the area for image display may be avoided from the area of a projection of the eye at a viewing angle at which the eye focuses on the display screen, so that the eye can watch the entity object 300 through the area on the display screen other than the area 1105 for image display.

When the processor of the electronic device 100 detects that the eye focus of the user 200 returns to the fixed focus of the display screen 1100, the processor of the electronic device 100 may switch the area for image display to the central area of the display screen, and enlarge the area for image display, or use the entire area of the display screen to display the image.

In this embodiment of this application, a moving or narrowing direction of the area for image display on the display screen may be determined according to a viewing angle obtained by eye tracking. After the area for image display on the display screen is moved or narrowed, the eye may watch the entity object 300 through an area on the display screen other than the area for image display on the display screen.

Moving and narrowing the area for image display on the display screen to the area beyond the area of a projection of the eye at a viewing angle at which the eye focuses on the display screen can reduce impacts of the displayed image on watching the entity object 300 by the user. Because the display screen is not turned off, a response speed can also be improved when the display of the display screen is restored.

Figure 4E:
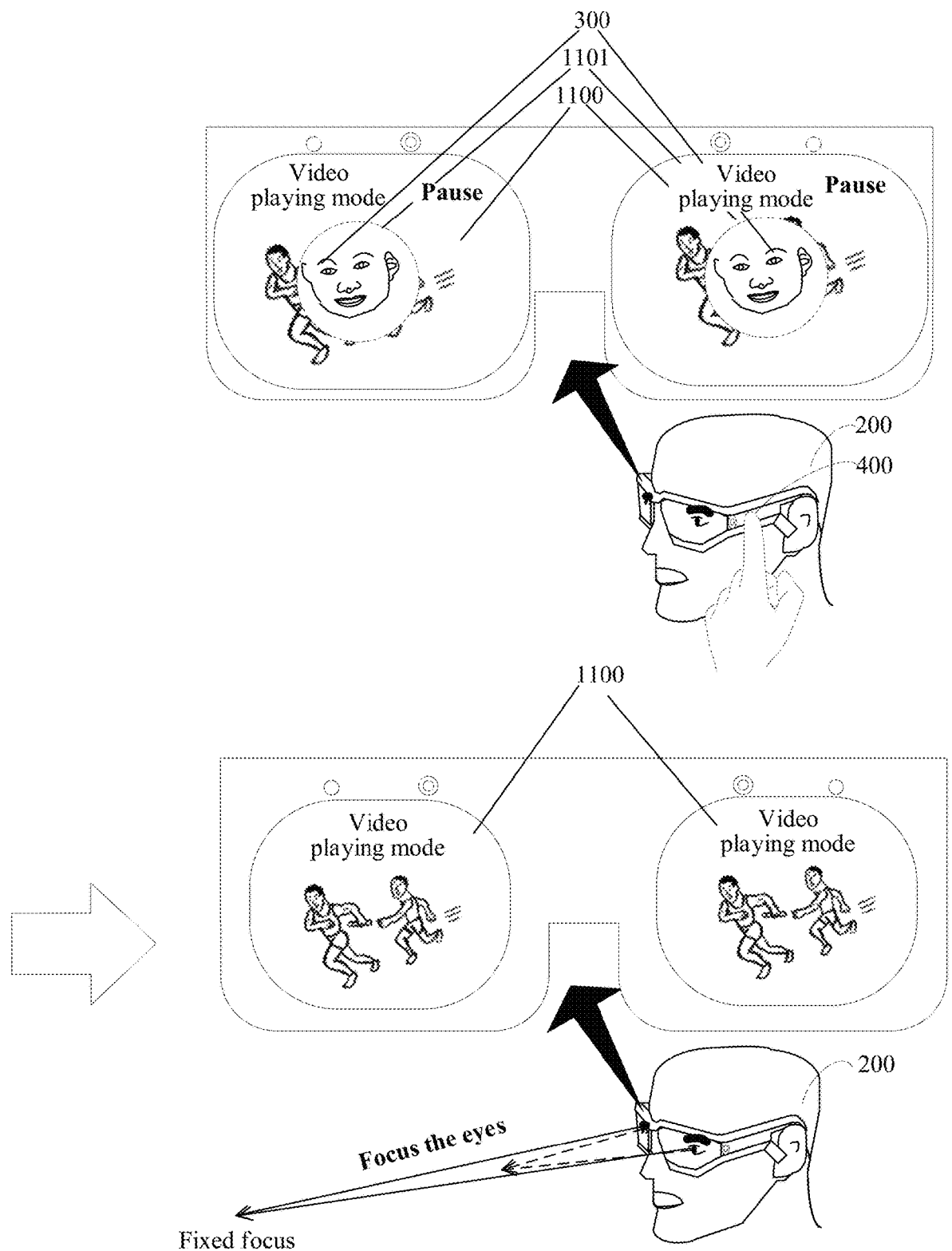
Figure 4F:
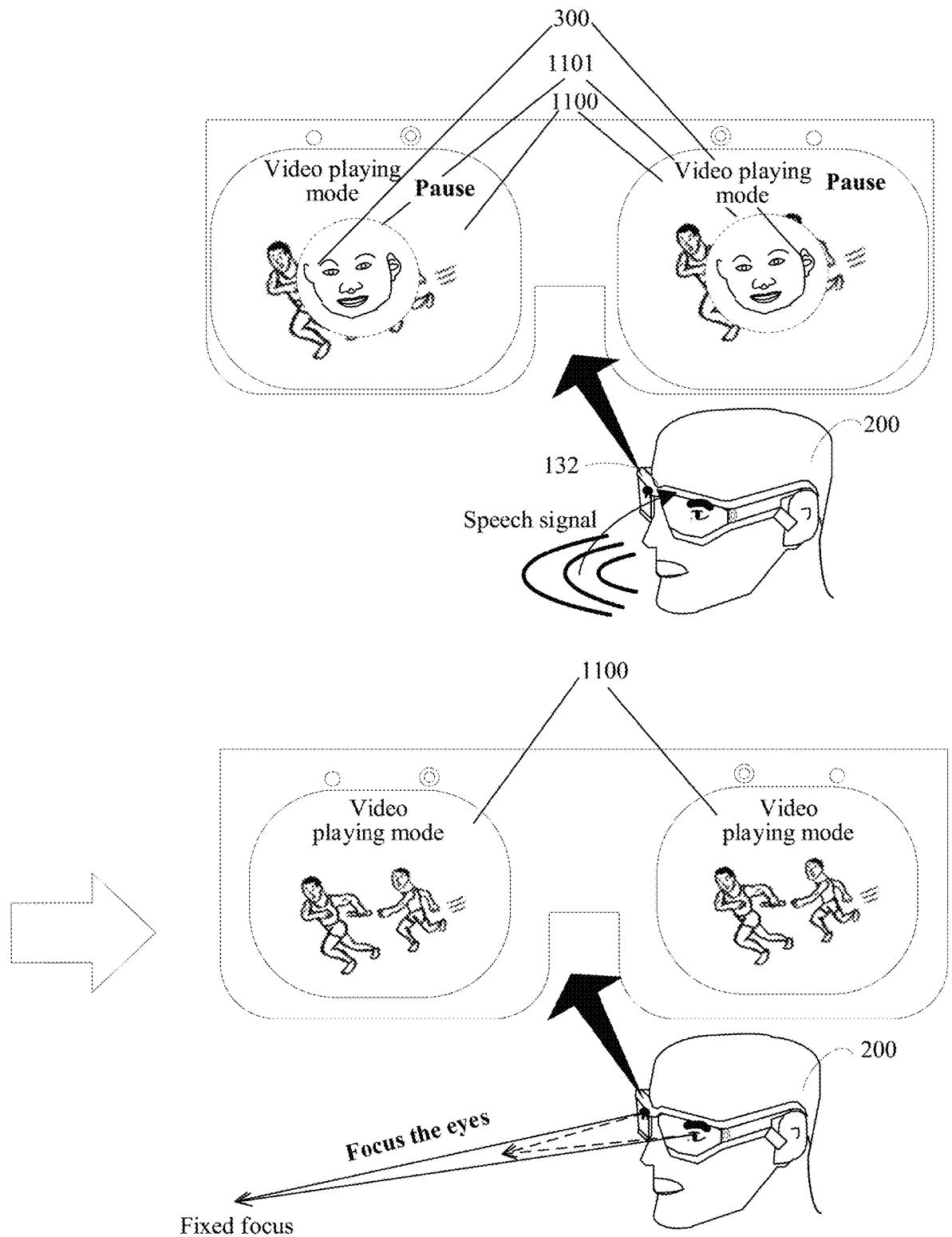

Optionally, the electronic device 100 may restore, in response to a user operation, the image displayed on the display screen. The user operation may be a key operation, a gesture operation, a speech signal, or the like. Refer to FIG. 4e and FIG. 4f. FIG. 4e and FIG. 4f are respectively schematic diagrams of a man-machine interaction example.

As shown in FIG. 4e, in a case that the display of the first area 1101 on the display screen 1100 is turned off or the brightness of the first area 1101 is reduced, or the display of the display screen 1100 is turned off, the electronic device 100 may restore image displaying on the first area 1101 or the display screen when an operation of pressing a second key is detected.

Optionally, as shown in FIG. 4e, in a case that the display of the first area 1101 on the display screen 1100 is turned off or the brightness of the first area 1101 is reduced, or the display of the display screen 1100 is turned off, the processor in the electronic device 100 may further invoke an ambient light sensor to detect light reflected when a finger approaches, and then the displayed image on the first area 1101 or the display screen can be restored.

Optionally, as shown in FIG. 4e, in a case that the display of the first area 1101 on the display screen 1100 is turned off or the brightness of the first area 1101 is reduced, or the display of the display screen 1100 is turned off, the processor in the electronic device 100 may further invoke a camera to detect a specific gesture, for example, a second gesture, and then the displayed image on the first area 1101 or the display screen can be restored. The processor may invoke an image recognition algorithm to recognize the specific gesture (second gesture) collected by the camera. The second gesture may be, for example, one or more of the following gestures: a "v" gesture, a fist, a finger snap, or an OK gesture, and the like.

Optionally, in a case that the display of the first area 1101 on the display screen 1100 is turned off or the brightness of the first area 1101 is reduced, or the display of the display screen 1100 is turned off, the processor in the electronic device 100 may restore the displayed image on the first area 1101 or the display screen when one or more of the followings is detected: a. a user operation; and b. the eye focus of the user being on the fixed focus of the display screen 1100.

As shown in FIG. 4f, in a case that the display of the first area 1101 on the display screen 1100 is turned off or the brightness of the first area 1101 is reduced, or the display of the display screen 1100 is turned off, the electronic device 100 may restore the displayed image on the first area 1101 or the display screen when a second speech signal is detected. When the processor in the electronic device 100 acquires the second speech signal through a sound detector, the processor may restore the displayed image on the first area 1101 or the display screen. A mapping relationship between the second speech signal and an instruction to restore display may be stored in the electronic device 100.

It may be understood that, not limited to a key operation, a gesture operation, and a voice operation, the electronic device may further detect other signals, for example, a display screen touch operation and a brainwave signal, to restore the display of the display screen.

Optionally, after the display of the display screen is turned off, when it is detected that the eye focus of the user frequently changes within a specific time period (for example, within one minute), for example, a focal length change frequency is greater than 5 times within one minute, the head-mounted electronic device may restore the display of the display screen and display in low brightness. For example, the display screen may be displayed in 30% of the brightness before the display is turned off. An image displayed in low brightness may be used for the eye of the user to focus. When it is detected that the eye focus of the user returns to the fixed focus of the display screen, the brightness of the display screen may be adjusted to a normal brightness, for example, the brightness before the display is turned off. When the display screen is displayed in low brightness for a period of time, for example, 20 seconds, the eye focus of the user is detected to be not within the fixed focus of the display screen, then the display of the display screen is turned off. Alternatively, when the display screen is displayed in low brightness for a period of time, for example, 20 seconds, the eye focus of the user is detected to change frequently, then the display of the display screen is turned off.

Optionally, after the display of the display screen is turned off, the head-mounted electronic device may turn on the display screen again at intervals, for example, two minutes, for the eye of the user to refocus. If it is detected that the display screen is not focused within 5 seconds after the display screen is turned on, the display screen is turned off. When the display screen is turned on again, the brightness of the display screen may be low, for example, 30% of the brightness before the display is turned off. The brightness of the display screen is adjusted to the normal brightness only when it is detected that the eye focus of the user returns to the fixed focus of the display screen, for example, the brightness is adjusted to the brightness before the display is turned off.

Figure 4G:
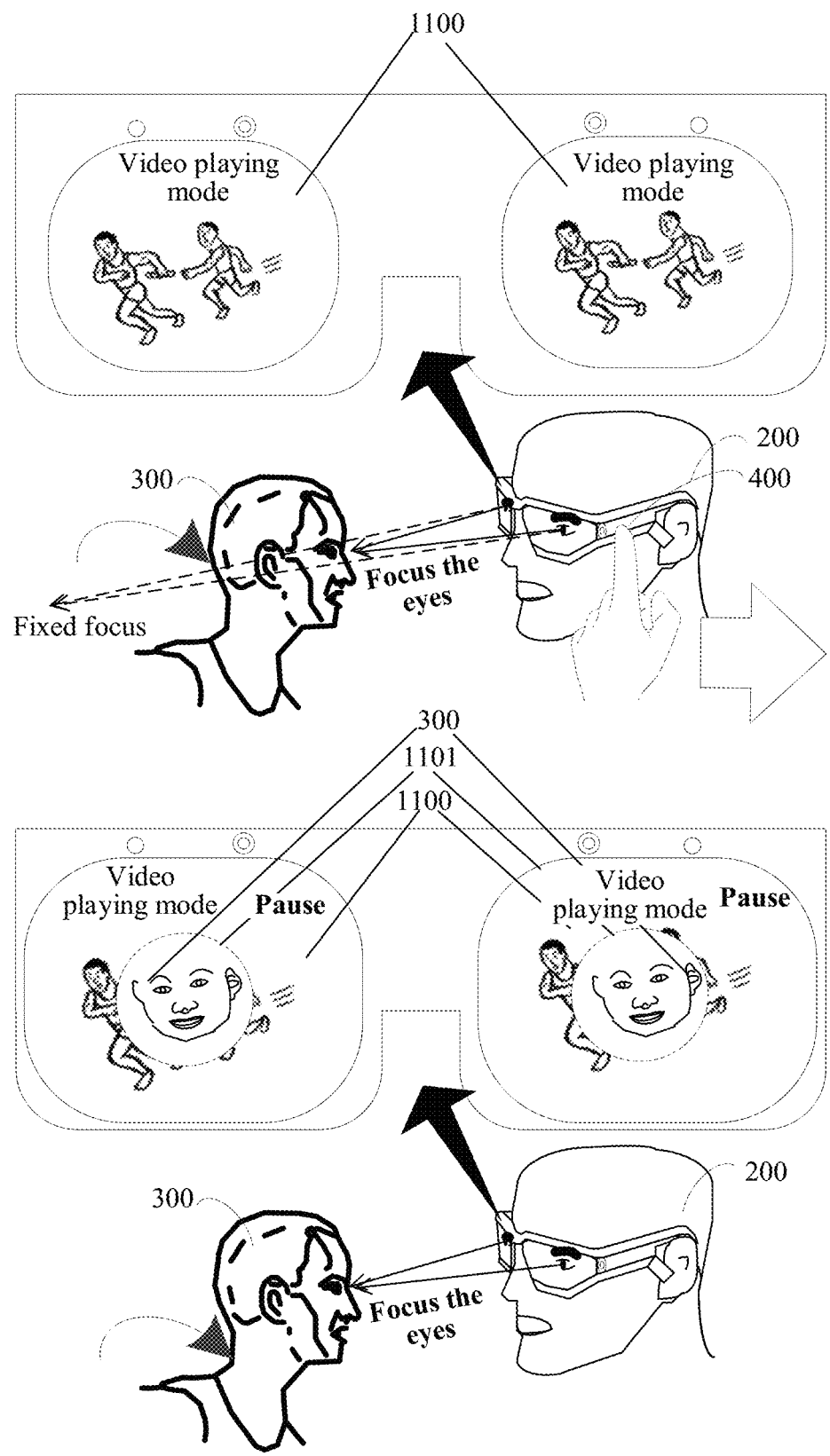
Figure 4H:
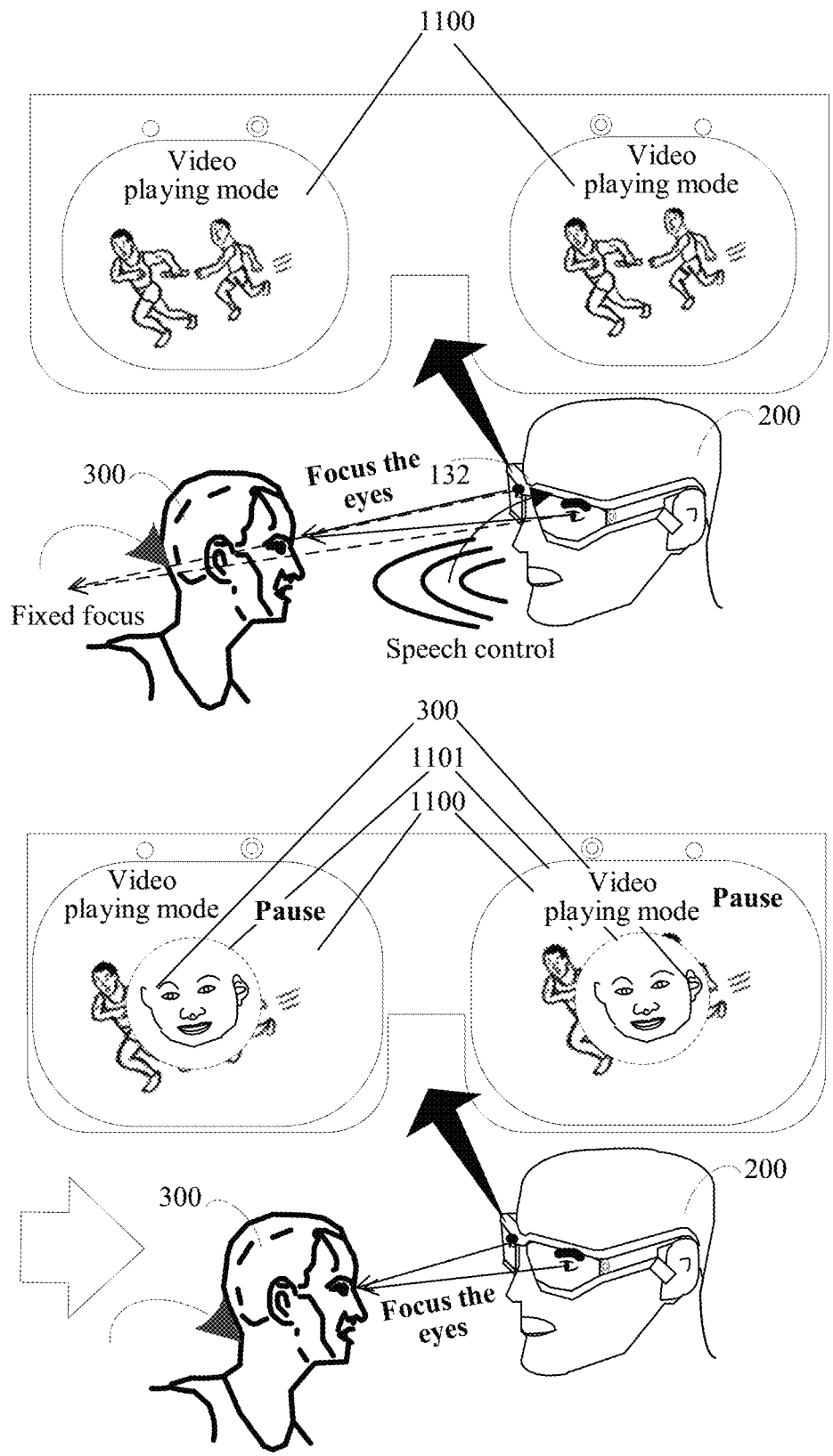

Optionally, the electronic device 100 may turn off the display of the display screen, or move or narrow the area for image display on the display screen in response to a user operation. The user operation may also be a key operation, a gesture operation, a speech signal, or the like. Refer to FIG. 4g and FIG. 4h. FIG. 4g and FIG. 4h are respectively schematic diagrams of a man-machine interaction example.

As shown in FIG. 4g, in a case that an image is displayed on the display screen 1100, and the electronic device 100 detects an operation of pressing a first key, then any one of the followings may be performed: turning off the display of the display screen 1100; turning off the display of the first area on the display screen; moving the area for image display on the display screen; and moving and narrowing the area for image display on the display screen.

Optionally, as shown in FIG. 4g, in a case that the image is displayed on the display screen 1100, and the processor in the electronic device 100 invokes the ambient light sensor to detect the light reflected when the finger approaches, then the processor may perform any one of the followings: turning off the display of the display screen 1100; turning off the display of the first area on the display screen; moving the area for image display on the display screen; and moving and narrowing the area for image display on the display screen.

Optionally, as shown in FIG. 4g, in a case that an image is displayed on the display screen 1100, and the processor in the electronic device 100 may further invoke the camera to detect a specific gesture, for example, a first gesture, then the processor may perform any one of the followings: turning off the display of the display screen 1100; turning off the display of the first area on the display screen; moving the area for image display on the display screen; and moving and narrowing the area for image display on the display screen. The first gesture may be, for example, one or more of the following gestures: a "v" gesture, a fist, a finger snap, or an OK gesture, and the like.

Optionally, as shown in FIG. 4g, in a case that an image is displayed on the display screen 1100, the processor in the electronic device 100 may turn off the display of the display screen when one or more of the followings is detected: a. the user operation; and b. the eye focus of the user being beyond the fixed focus of the display screen 1100.

As shown in FIG. 4h, in a case that an image is displayed on the display screen 1100, and the electronic device 100 detects a first speech signal, then any one of the followings may be performed: turning off the display of the display screen 1100; turning off the display of the first area on the display screen; moving the area for image display on the display screen; and moving and narrowing the area for image display on the display screen. The processor in the electronic device 100 may detect the first speech signal through the sound detector. The first speech signal may be a specific speech signal preset by a system. A mapping relationship between the first speech signal and an instruction to turn off the display of the display screen may be stored in the electronic device 100.

Restoring the image displaying of the display screen through the user operation, and turning off the display on the display screen, or moving or narrowing the area for image display on the display screen through the user operation can reduce misoperations and improve an accuracy of controlling the image displaying of the display screen.

In this embodiment of this application, a mapping relationship between the user operation and an instruction may be stored in the electronic device 100. The instruction may include: restoring the image displaying of the display screen; turning off the display of the display screen; turning off the display of the first area on the display screen; moving the area for image display on the display screen; and moving and narrowing the area for image display on the display screen. The mapping relationship may be preset by the system, or may be customized in response to the user operation. The following provides an example of customizing the mapping relationship between the user operation and the instruction.

Figure 4I:
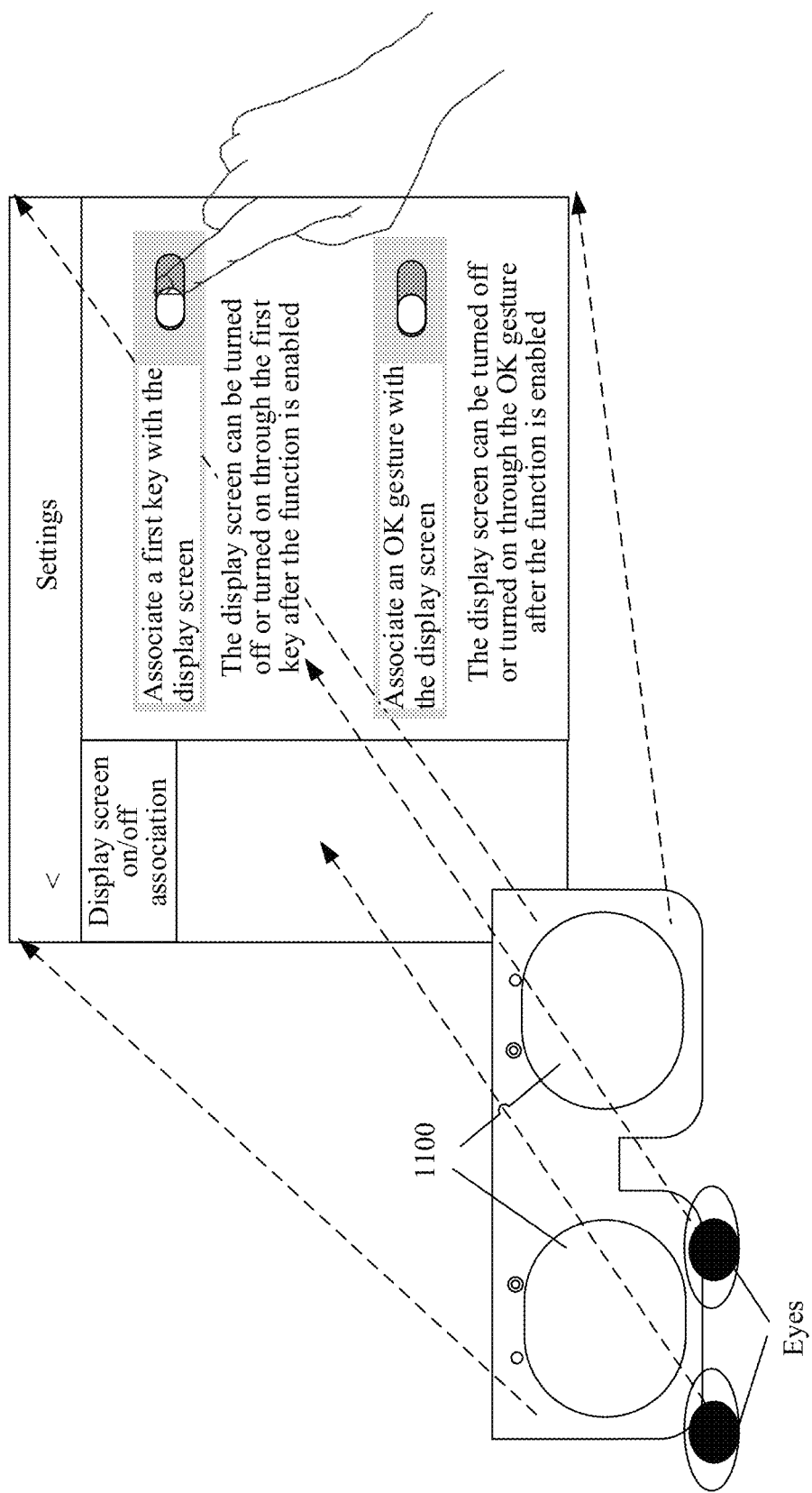

Refer to FIG. 4i. FIG. 4i is a schematic diagram of a man-machine interaction example. As shown in FIG. 4i, a user may enable an option of "associating a first key with the display screen" on a setting interface of the head-mounted display device, and the head-mounted display device may establish, in response to the enabling operation, a mapping relationship between pressing of the first key and turning on/off of the display screen. After the option of "associating a first key with the display screen" is enabled, the electronic device may respond to the pressing operation of the first key, and turn off the lit display screen 1100 or turn on the display screen 1100 that is turned off. Similarly, as shown in FIG. 4i, the user may enable an option of "associating an OK gesture with the display screen" on the setting interface of the head-mounted display device, and the head-mounted display device may establish, in response to the enabling operation, a mapping relationship between the OK gesture and turning on/off of the display screen. After the option of "associating an OK gesture with the display screen" is enabled, the electronic device may respond to the OK gesture detected by the camera, turn off the lit display screen 1100 or turn on the display screen 1100 that is turned off.

Detecting, by the electronic device, that the user enables the option of "associating a first key with the display screen" may be detecting, by the processor in the electronic device through camera, that a finger is placed at an enable switch of the option of "associating a first key with the display screen".

It may be understood that the example of customizing the mapping relationship between the user operation and the instruction shown in FIG. 4i is merely used to explain this embodiment of this application, and should not constitute a limitation. The setting interface may further include another option for customizing a correspondence between the user operation and the instruction. This is not limited in this embodiment of this application.

Figure 4J:
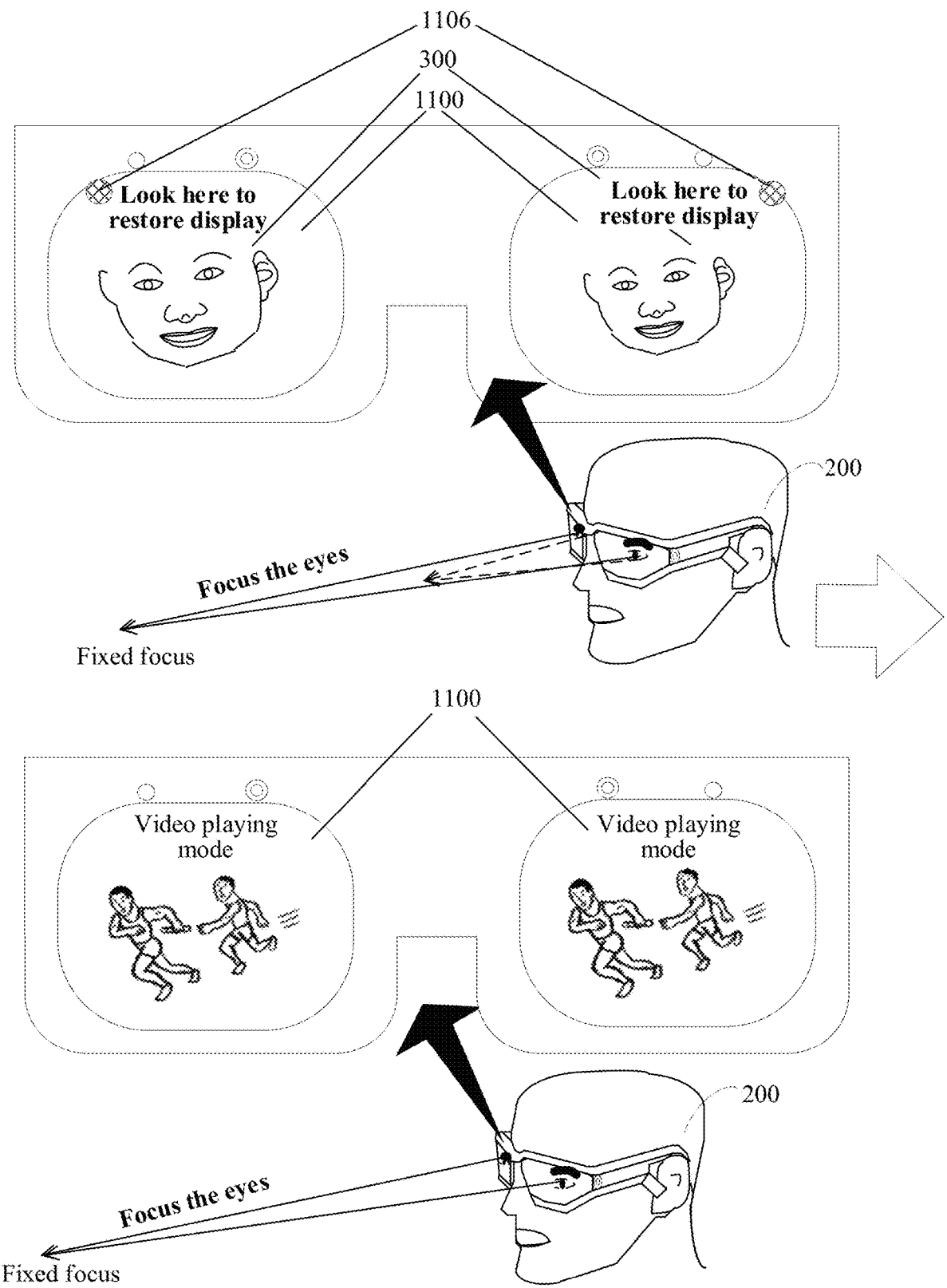

Optionally, as shown in FIG. 4j, after the display of the display screen 1100 is turned off, a tag 1106 may still be displayed on the display screen 1100. The tag 1106 may be, for example, a circular bright spot. The tag 1106 may be displayed at an edge of the display screen 1100, such as an upper left corner or an upper right corner. A prompt message "look here to restore display" may be displayed on the display screen 1100. As shown in FIG. 4*j*, when the eye is focused on the tag 1106, the head-mounted electronic device may turn on the display screen 1100 again.

Figures 1, 4K:
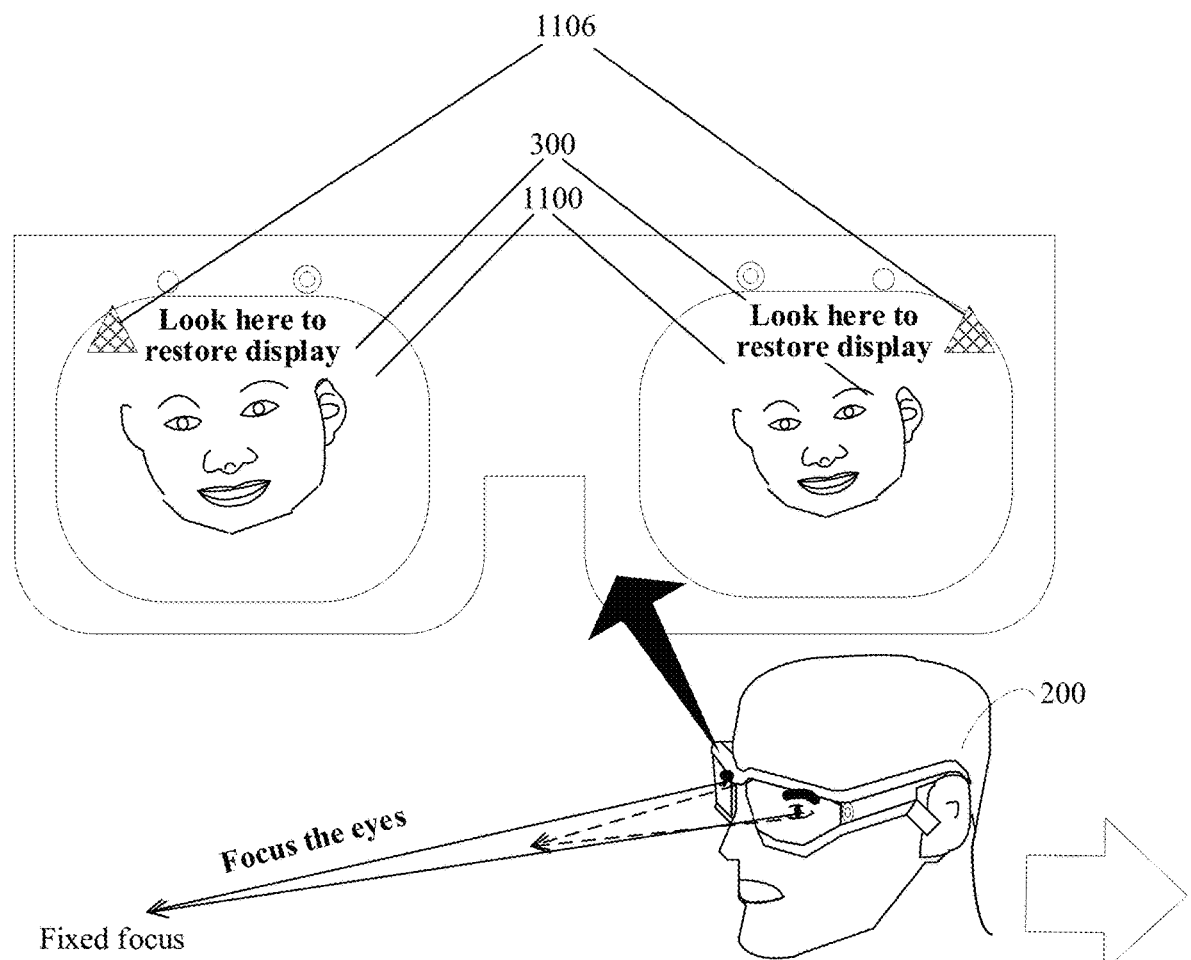
Figures 2, 4K:
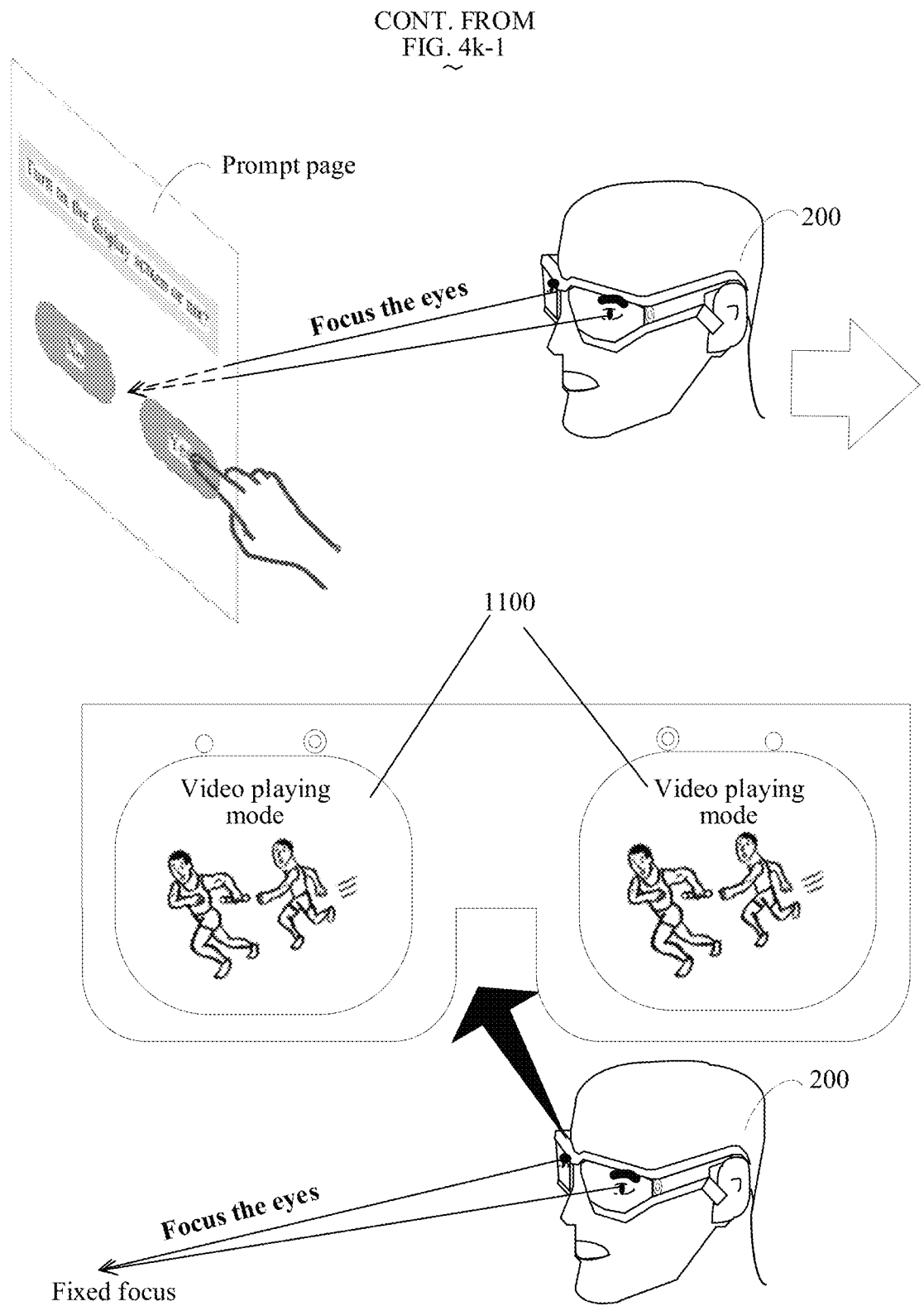

Optionally, refer to FIG. 4*k*-1 and FIG. 4*k*-2. FIG. 4*k*-1 and FIG. 4*k*-2 are a schematic diagram of a man-machine interaction example provided by an embodiment of this application. As shown in FIG. 4*k*-1 and FIG. 4*k*-2, after the display of the display screen 1100 is turned off, the tag 1106 may still be displayed on the display screen 1100. The tag 1106 may be, for example, a triangle bright spot. The tag 1106 may be displayed at an edge of the display screen 1100, such as an upper left corner or an upper right corner. A prompt message "look here to restore display" may be displayed on the display screen 1100. As shown in FIG. 4*k*-1 and FIG. 4*k*-2, when the eye is focused on the tag 1106, the head-mounted electronic device may open a prompt page. The prompt page may prompt the user whether to turn on the display screen. When the head-mounted electronic device detects, through the camera, that a finger is put in a "yes" position, the display of the display screen is restored.

Optionally, in this embodiment of this application, the head-mounted electronic device may turn on or turn off the display of the display screen when it is detected that the eye is a specific state by using the camera, for example, the eye is upturned, downturned, or blinked quickly.

In different scenarios, the user has different requirements on a response speed of restoring or turning off the display screen. For example, in a video watching mode, the user has a high requirement on the response speed. However, in a scenario of using AR glasses for navigation, the user does not need to pay attention to navigation information displayed on the display screen at all times, and the user has a relatively low requirement on the response speed of restoring or turning off the display screen. The backlight, the display panel, and the driver IC of the display screen may be turned off, to further reduce the power consumption. In this embodiment of this application, the electronic device 100 may set, according to requirements on the response speed of restoring or turning off the display screen in different scenarios, different solutions for turning off the display of the display screen. In a scenario where the user has a higher requirement on the response speed (for example, video watching scenario), only the backlight or the display panel of the display screen may be turned off. In a scenario where the user has a lower requirement on the response speed (for example, navigation scenario), the backlight, the display panel, and the driver IC of the display screen may all be turned off, to further reduce the power consumption. For specific descriptions of turning off the backlight, the display panel, and the driver IC of the display screen, refer to the examples shown in FIG. 9*a* and FIG. 9*b*. Details are not described herein again.

Figures 1, 5:
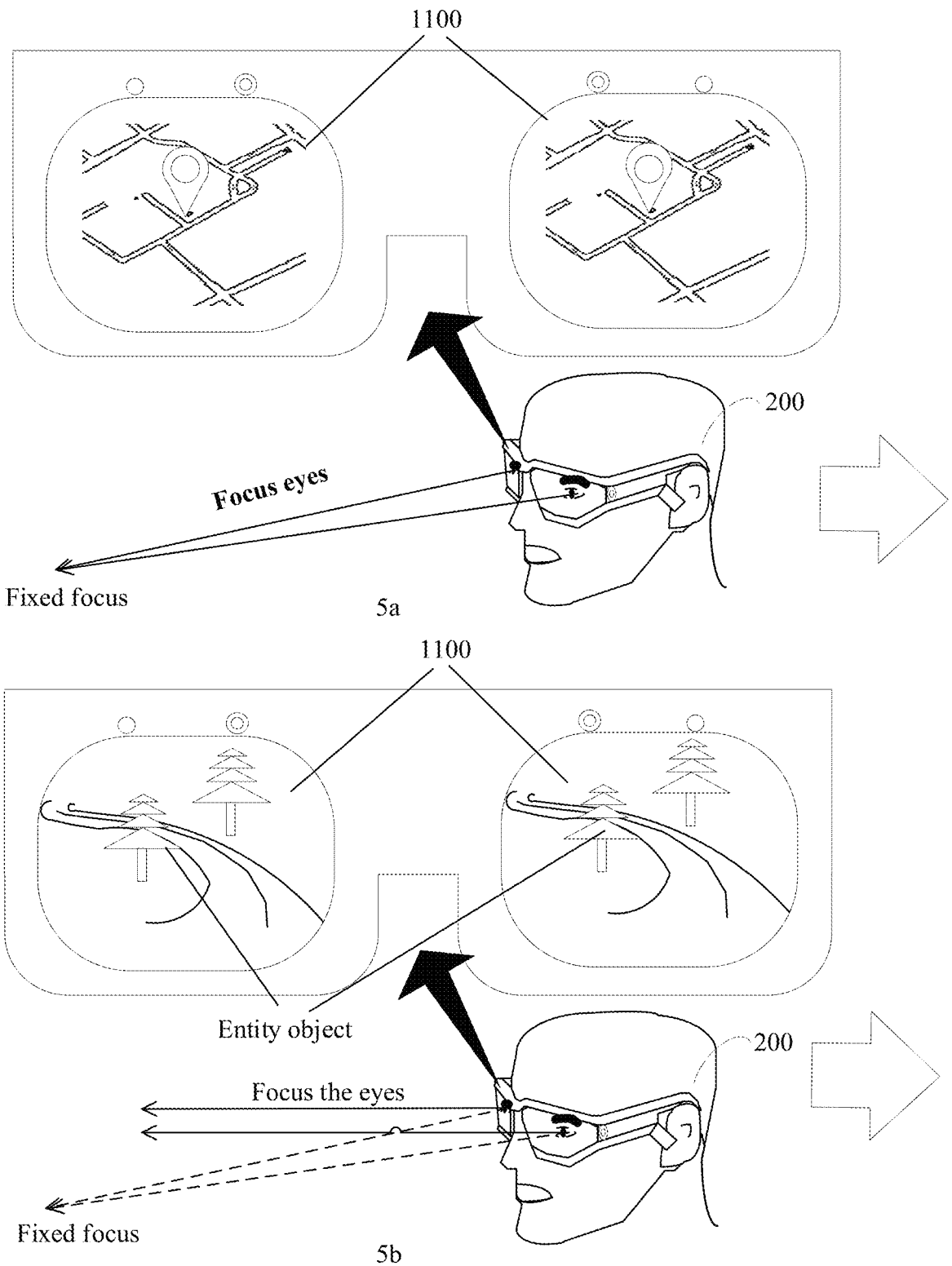
Figures 2, 5:
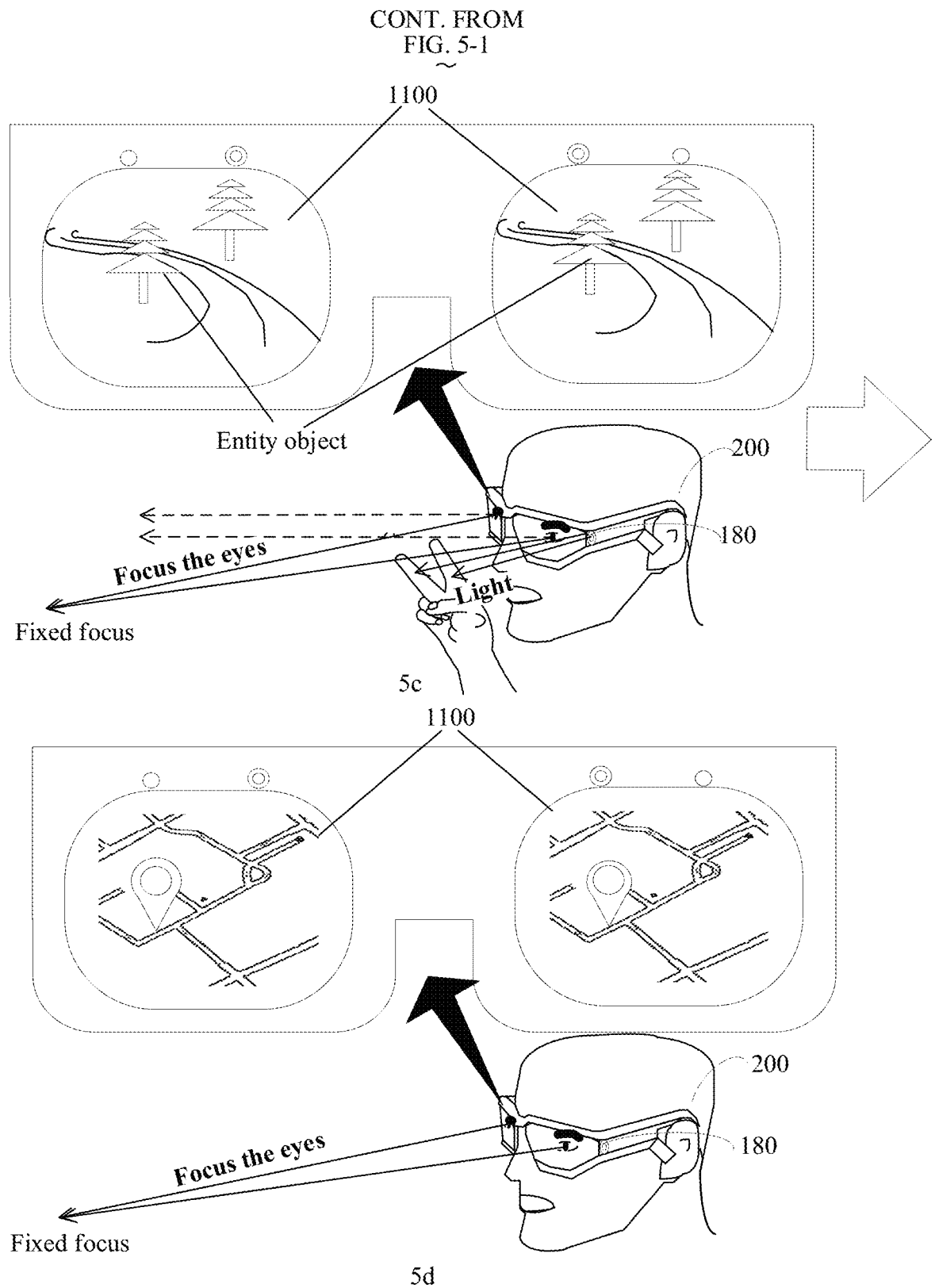

For the navigation scenario, refer to FIG. 5-1 and FIG. 5-2. FIG. 5-1 and FIG. 5-2 are a schematic diagram of some man-machine interactions in a navigation scenario according to an embodiment of this application. As shown in FIG. 5*a* in FIG. 5-1, navigation information may be displayed on a display screen 1100. When a user 200 focuses an eye focus to a fixed focus of the display screen (for example, two meters in front of the eye), the user 200 may clearly see the navigation information displayed on the display screen. When the user needs to watch the real world after reading the navigation information, as shown in FIG. 5*b* in FIG. 5-1 and FIG. 5-2, a focal length detection optical sensor in a head-mounted display device may detect that a focal length of the eye is at a location beyond the fixed focus of the display screen, for example, ten meters in front of the eye. A processor in the head-mounted display device may turn off display of the display screen 1100. Specifically, a backlight, a display panel, and a driver IC of the display screen 1100 may all be turned off. The turned-off display screen 1100 is transparent, and the user 200 may see an entity object through the display screen 1100. When the user 200 needs to watch the navigation information of the display screen again, as shown in FIG. 5*c* in FIG. 5-1 and FIG. 5-2, an electronic device may restore image displaying of the display screen in response to a user gesture. For the description of the user gesture, reference may be made to the descriptions of FIG. 4*e* and FIG. 4*g*. Details are not described herein again. As shown in FIG. 5*d* in FIG. 5-1 and FIG. 5-2, when the gesture of the user is detected, the electronic device may restart the display screen to display the navigation information.

It may be understood that the processor in the electronic device 100 may restore a displayed image on the display screen when one or more of the followings is detected: a. the user gesture; and b. the eye focus of the user being on the fixed focus of the display screen 1100.

Optionally, the head-mounted electronic device may include a speed sensor to detect a moving speed of the device. When the head-mounted electronic device detects, through the speed sensor, that the moving speed exceeds a speed threshold, for example, exceeds 50 km/h, the head-mounted electronic device may turn off the display of the display screen, or move the navigation information displayed on the display screen to a side of the display screen, as shown in FIG. 4*c*, or may further move and narrow an image displaying position on the display screen, as shown in FIG. 4*d*. The display screen is turned off when it is detected that the moving speed of the head-mounted electronic device is excessively high. Therefore, a case that the safety of the user affected by the image displaying of the display screen when the user moves too fast in a navigation scenario can be reduced, thereby providing convenience for the user.

Figures 1, 6:
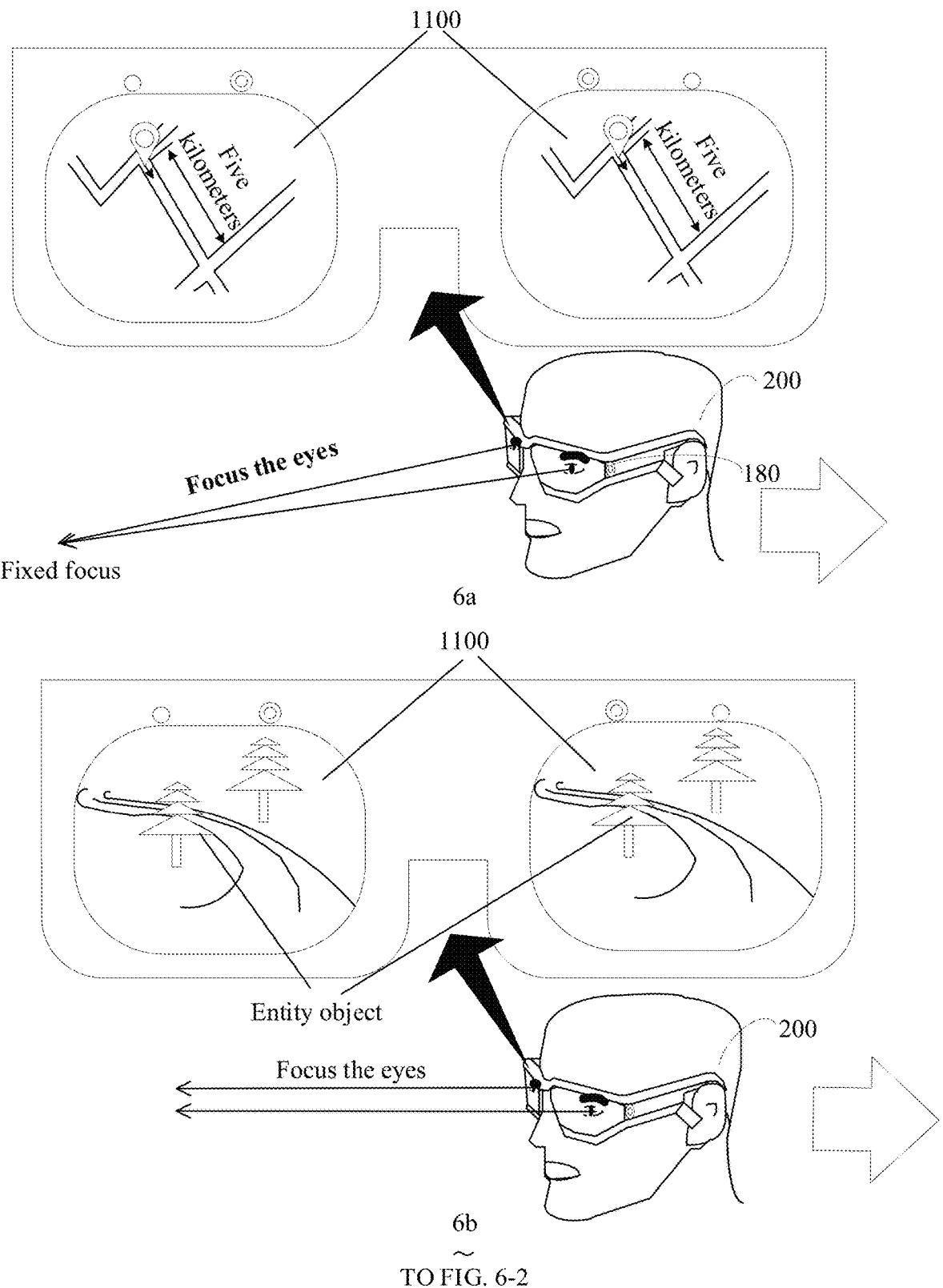
Figures 2, 6:
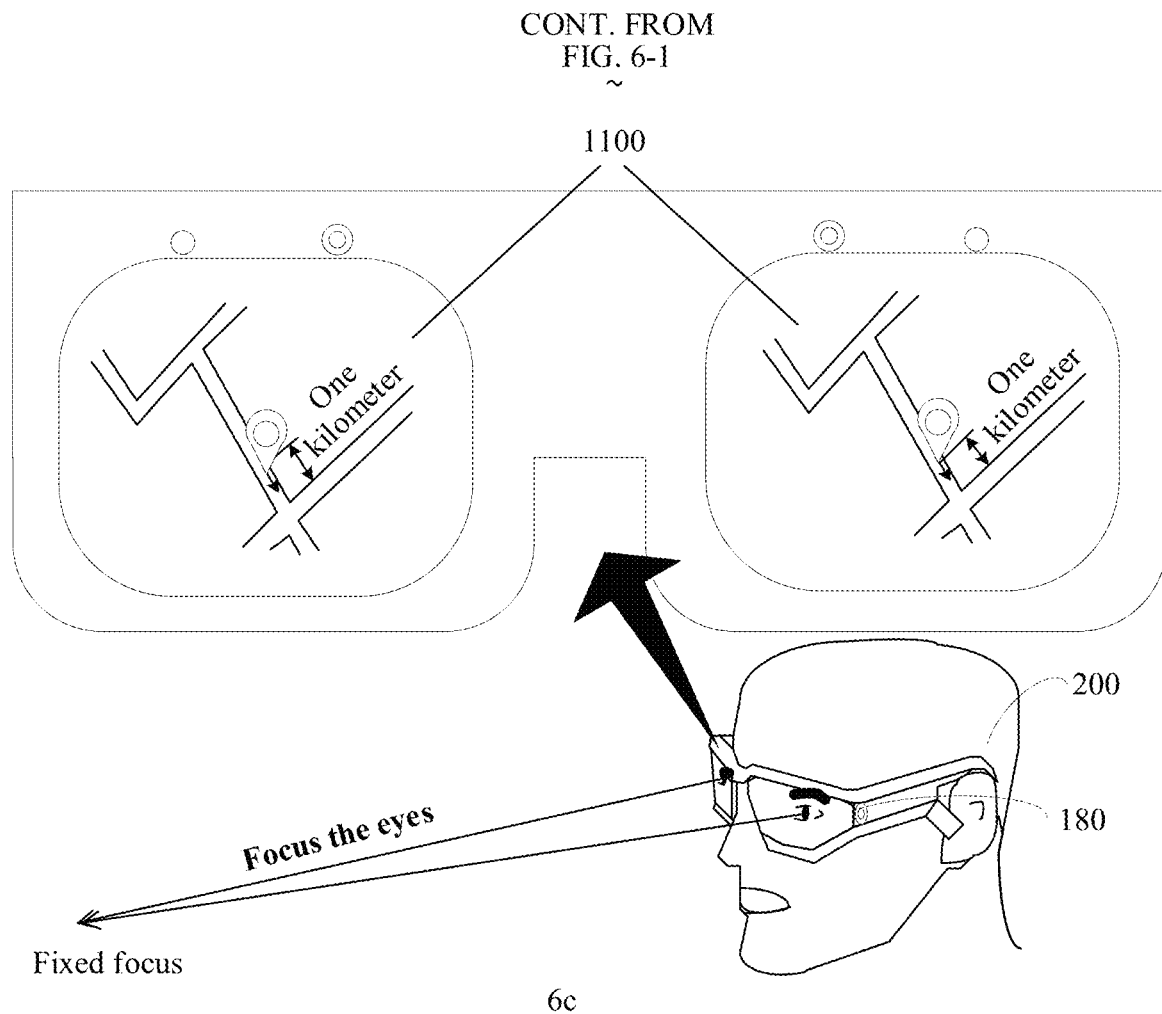

Optionally, in the navigation scenario, if the head-mounted electronic device determines, according to a location of the device, that there is no intersection within a distance threshold range in a moving direction along a current travel route, for example, there is no intersection within one kilometer, then the head-mounted electronic device may turn off the display of the display screen. Refer to FIG. 6-1 and FIG. 6-2. FIG. 6-1 and FIG. 6-2 are a schematic diagram of some other man-machine interactions in a navigation scenario according to an embodiment of this application. As shown in FIG. 6*a* in FIG. 6-1 and FIG. 6-2, when a head-mounted electronic device detects that an intersection appears only after 5 km in the current moving direction, then it is determined that there is no intersection in the moving direction of the current travel route, for example, there is no intersection within one kilometer in a moving direction along a current travel route. Then, as shown in FIG. 6*b* in FIG. 6-1 and FIG. 6-2, the head-mounted electronic device may turn off display of a display screen 1100. After the display screen 1100 is turned off, a navigation and positioning system still works. When the head-mounted electronic device determines, according to the location of the device, that an intersection appears within 1 km, as shown in FIG. 6*c* in FIG. 6-1 and FIG. 6-2, then the head-mounted electronic device may turn on the display screen 1100 again to display the navigation information. In a navigation scenario, when an intersection to which the user needs to pay attention is not approached, the display of the display screen is reduced, so that power consumption of the head-mounted electronic device can be reduced, and a case that a line of sight of the user being blocked by the image displaying of the display screen can be reduced, thereby providing convenience for the user.

An image related to an entity object in a viewing angle of the electronic device may be displayed on the display screen of the electronic device. The entity object in the viewing angle of the electronic device may be determined by using an image captured by a camera. For example, if the camera collects an image of clothes, a processor in the electronic device determines, by using image recognition, that image content is "clothes", determines information such as a brand, a price, and a shopping link of the clothes, and displays the information on the display screen.

When the image displayed on the display screen is aimed at a plurality of entity objects that successively enter the viewing angle of the electronic device, the electronic device may obtain, through statistics, a status of an eye of the user continuously staring at images on the display screen in a period of time, and determine, according to a statistical result, whether to turn off the display screen. When the electronic device detects that an image of an entity object 1 on the display screen is not focused by the eye, the display of the display screen is turned off. Then, when an entity object 2 appears in the viewing angle of the electronic device, the display screen needs to be turned on again to display an image of the entity object 2 on the display screen. If it is detected that the image of the entity object 2 on the display screen is not focused by the eye, the display of the display screen is turned off again.

To reduce a quantity of times that the display screen is repeatedly turned off or turned on, the electronic device may turn off the display panel and the driver IC when it is detected that none of images of N (an integer greater than 1) consecutive entity objects on the display screen is focused by the eye. Then, the display screen and the driver IC are turned on only when one or more of the followings are detected, to display an image of an entity object in a current viewing angle of the electronic device: a. the eye focus being focused in the fixed focus of the display screen; b. response to a certain user operation; and c. M (an integer greater than 1) entity objects successively entering the viewing angle of the electronic device.

The electronic device may relax a condition for turning off the display of the display screen when it is detected that images of S (an integer greater than 1) consecutive entity objects on the display screen are all focused by the eye. Specifically, a value of a first threshold in the condition may be decreased, and a value of a second threshold and a value of a first duration may be increased. In this way, a quantity of times that the display screen is repeatedly turned off and on can be reduced, a service life of the display screen is prolonged, and stimulation on the eye caused by repeatedly turning off or turning on the display screen can be reduced.

For example, when a user wearing AR glasses detects an image of an animal 1 in a viewing angle of the AR glasses in a zoo scenario, the AR glasses determine, by image recognition, that image content is "animal 1". The AR glasses may determine, according to the "animal 1", that display content of the display screen is an image associated with the animal 1. A display screen of the AR glasses displays the image associated with the animal 1, for example, may include a webpage link, a distribution location, a protection level, and a related animation video of the animal 1. When it is detected that the image associated with the animal 1 on the display screen is not focused by the eye, the display screen is turned off. Then, when an image of an animal 2 in the viewing angle of the AR glasses is detected, the AR glasses turn on the display screen and display an image associated with the animal 2. After it is detected that the image associated with the animal 2 on the display screen is still not focused by the eye, the display screen is turned off. Similarly, when an image associated with an animal 3 is still not focused by the eye, the display screen is turned off. In this case, the AR glasses may continuously turn off the display screen until it is detected that the eye focus is in the fixed focus of the display screen, and then the display screen is turned on to display an image. Or, the display screen is turned on to display an image until a user operation is detected. Or, the display screen is turned on to display an image until it is detected that four entity objects successively enter the viewing angle of the electronic device.

For another example, in the navigation scenario, the display screen displays the navigation information. When the AR glasses detect that the eye focus is not in the fixed focus of the display screen, a backlight of an LCD display screen may be turned off. When the AR glasses detect that the eye focus does not return to the fixed focus of the display screen for five minutes, a display panel of the LCD display screen may be turned off. When the AR glasses detect that the eye focus does not return to the fixed focus of the display screen for ten minutes, a driver IC of the LCD display screen may also be turned off.

The head-mounted electronic device may further acquire, through machine learning, a quantity of times or a probability of an image corresponding to a different entity object being historically focused by the user. The head-mounted electronic device may determine a triggering condition for turning off the display screen according to a quantity of times or a probability of each type of entity object being historically focused. The larger the quantity of times or the probability is, the looser the triggering condition set for turning off the display screen for the entity object can be. For example, the smaller the value of the first threshold is, the larger the values of the second threshold and the first duration are.

Different entity objects may include, for example, a person, a car, an animal, a building, and the like.

For example, the head-mounted electronic device obtains the following results through machine learning: when a person appears in a viewing angle of a camera, and an image is displayed on the display screen as a human-associated image through image recognition, a probability of the image on the display screen being focused by the eye is 85%. When a car appears in the viewing angle of the camera, and an image is displayed on the display screen as a car-associated image through image recognition, the probability of the image on the display screen being focused by the eye is 50%. When a building appears in the viewing angle of the camera, and the image is displayed on the display screen as a building-associated image through image recognition, the probability of the image on the display screen being focused by the eye is 10%. When the person appears in the viewing angle of the camera, and the fixed focus of the display screen is focused by the eye for less than one second, the electronic device determines that the image on the display screen is not focused by the eye. When the car appears in the viewing angle of the camera, and the fixed focus of the display screen is focused by the eye for less than two seconds, the electronic device determines that the image on the display screen is not focused by the eye. When the building appears in the viewing angle of the camera, and the fixed focus of the display screen is focused by the eye for less than three seconds, the electronic device determines that the image on the display screen is not focused by the eye.

According to the foregoing method, display content of the display screen preferred by the user is determined through machine learning, and then a condition for turning off the display screen is set according to the display content on the display screen preferred by the user. In addition to reducing the power consumption, whether the user needs to turn off the display screen can be determined more precisely.

The head-mounted electronic device may acquire, through machine learning, a quantity of times or a frequency of historical focusing performed by the user on images corresponding to different scenarios. The head-mounted electronic device may determine, according to a quantity of times or a frequency of an entity object being historically focused in each scenario, a triggering condition for turning off the display screen. The larger the quantity of times or the frequency of is, the looser the triggering condition set for turning off the display screen in the scenario can be. For example, the smaller the value of the first threshold is, the larger the values of the second threshold and the first duration are.

The different scenario may include, for example, a virtual fitting scenario, a scenic spot scenario, a navigation scenario, and the like.

For example, the electronic device obtains the following results through machine learning: in the virtual fitting scenario, the probability of the image on the display screen being focused is 95%. In the navigation scenario, the probability of the image on the display screen being focused is 48%. In the scenic spot scenario, the probability of the image on the display screen being focused is 5%. When the processor in the electronic device detects that the virtual fitting scenario is in the viewing angle of the camera, and the fixed focus of the display screen is focused for less than one second, the electronic device determines that the image on the display screen is not focused. When the navigation scenario is in the viewing angle of the camera, and the fixed focus of the display screen is focused by the eye for less than two seconds, the electronic device determines that the image on the display screen is not focused. When the scenic spot scenario is in the viewing angle of the camera, and the fixed focus of the display screen is focused by the eye for less than three seconds, the electronic device determines that the image on the display screen is not focused.

In this embodiment of this application, for a user suffering hyperopia or myopia, an eye degree may be corrected by using the head-mounted electronic device. Specifically, a slot for an additional lens may be disposed between the display screen and the eye, and the slot may fix myopia lenses or hyperopia lenses for vision correction.

In this embodiment of this application, in addition to displaying an image through the display screen, the head-mounted electronic device may include a projection system. The projection system may replace the display screen to directly generate a clear image in a field of vision of the user. The projection system may be, for example, a holographic waveguide display device that projects a visible holographic image to the eye by using a holographic technique.

In a scenario in which an image is projected to the eye of the user by using the projection system, in this embodiment of this application, turning off the display of the display screen may refer to turning off the projection system. After the projection system is turned off, the eye of the user cannot see the image projected by the projection system, but can see an entity object in a real world. Turning off a first area on the display screen may refer to that the projection system does not project an image at a location in the eye of the user corresponding to the first area. Reducing a brightness of the display screen may refer to that the projection system reduces a brightness of a projected image in the eye of the user. Moving an area for image display in the display screen may refer to moving a position of the projected image in the eye of the user. Narrowing the area for image display in the display screen may refer to narrowing an area occupied by the projected image in the eye of the user.

Figure 7:
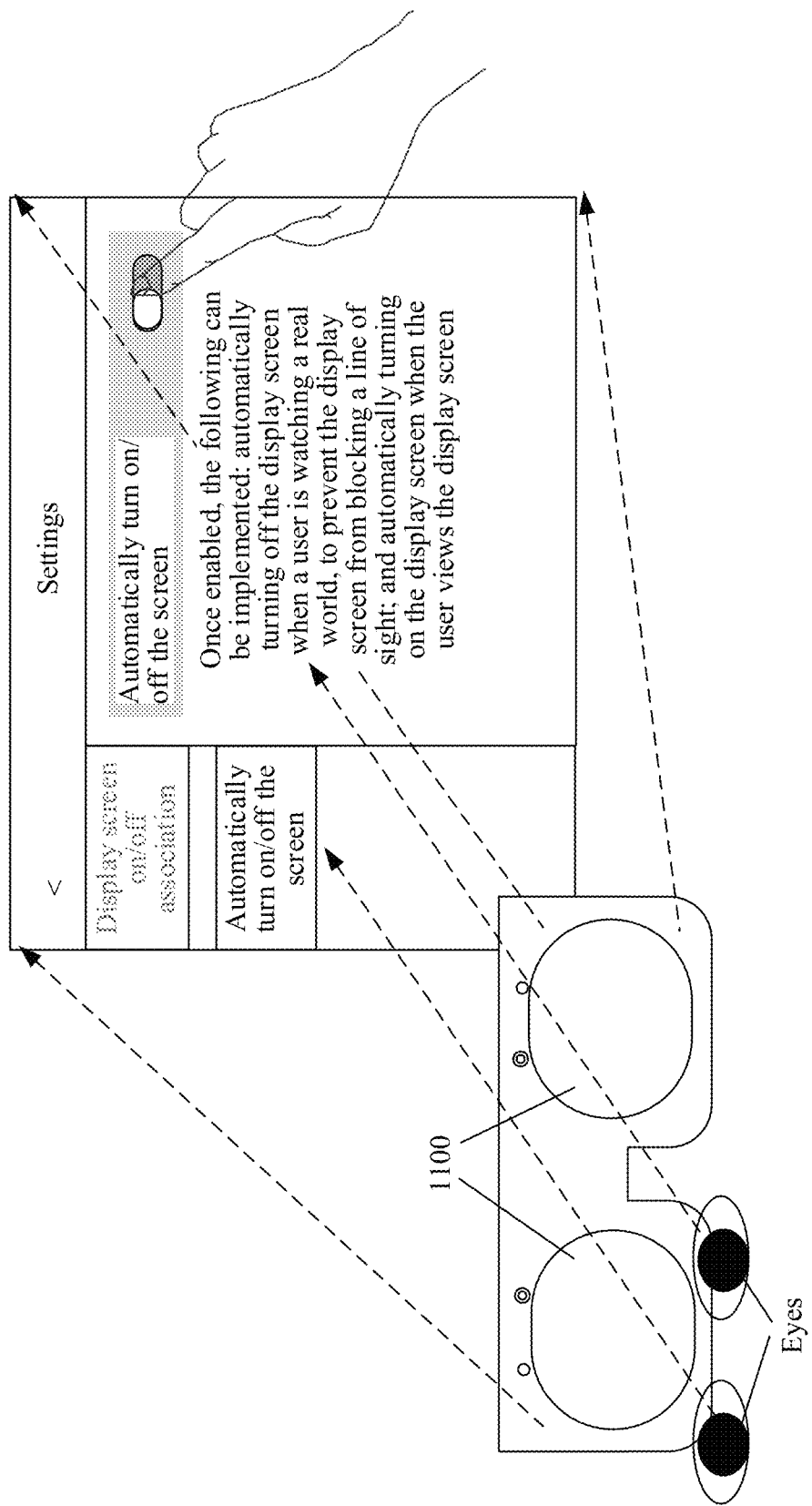
FIG. 7 is a schematic diagram of a man-machine interaction according to an embodiment of this application.

In this embodiment of this application, the electronic device may include two modes. In a first mode, the electronic device may turn off or turn on the display screen according to the eye focus. Refer to interaction manners shown in FIG. 3-1 and FIG. 3-2, FIG. 4a to FIG. 4k-1 and FIG. 4k-2, FIG. 5-1 and FIG. 5-2, and FIG. 6-1 and FIG. 6-2 for details. In a second mode, the display screen of the electronic device is not controlled by the eye focus. The electronic device may determine one mode in response to a user operation. Specifically, refer to FIG. 7. FIG. 7 is a schematic diagram of a man-machine interaction according to an embodiment of this application. As shown in FIG. 7, a user may enable an option of "turning on/off the screen through eye tracking" on a setting interface of a head-mounted display device, and then, the head-mounted display device may set the electronic device in the first mode in response to the enabling operation. After the option of "turning on/off the screen by eye tracking" is enabled, the electronic device may turn off or turn on display of the display screen according to the eye focus, and specifically perform the manners of turning on or off the display screen shown in FIG. 3-1 and FIG. 3-2, FIG. 4a to FIG. 4k-1 and FIG. 4k-2, FIG. 5-1 and FIG. 5-2, and FIG. 6-1 and FIG. 6-2.

Figure 8:
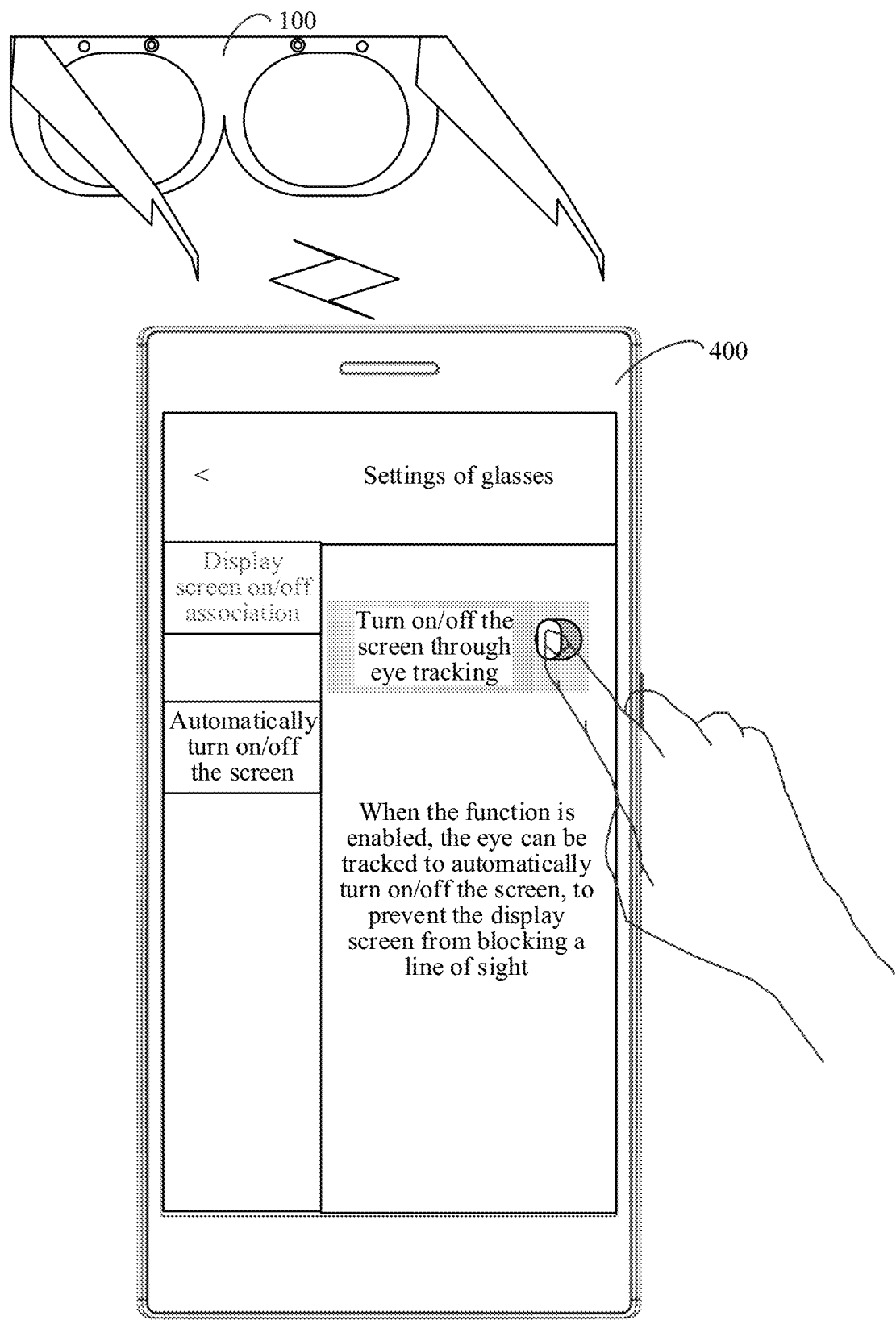
FIG. 8 is a schematic diagram of a man-machine interaction according to an embodiment of this application.

Refer to FIG. 8. FIG. 8 is a schematic diagram of a man-machine interaction according to an embodiment of this application. As shown in FIG. 8, a head-mounted electronic device 100 may establish a connection with another electronic device 400, such as a mobile phone or a tablet. The connection may be a Bluetooth connection, a WiFi connection, or another wireless connection. The connection may further be a wired connection. This is not limited in this embodiment of this application.

The head-mounted electronic device 100 may exchange data with the electronic device 400 through the established connection. The electronic device 400 may further receive a user operation, for example, a touch operation, and generate a setting instruction and send the setting instruction to the head-mounted electronic device 100. Specifically, as shown in FIG. 8, after the head-mounted electronic device 100 establishes the connection with the electronic device 400, the electronic device 400 may receive the touch operation of the user, and send an instruction used to enable a function of controlling the display screen according to the eye focus to the head-mounted electronic device 100. The head-mounted electronic device 100 enables the function: controlling the display screen according to the eye focus.

It may be understood that the example of interaction between the head-mounted electronic device 100 and the electronic device 400 shown in FIG. 8 is merely used to explain this embodiment of this application, and should not constitute a limitation. The head-mounted electronic device 100 may further set other parameters by using the electronic device 400, or exchange other data, for example, the setting interface in FIG. 4i.

Figure 9A:
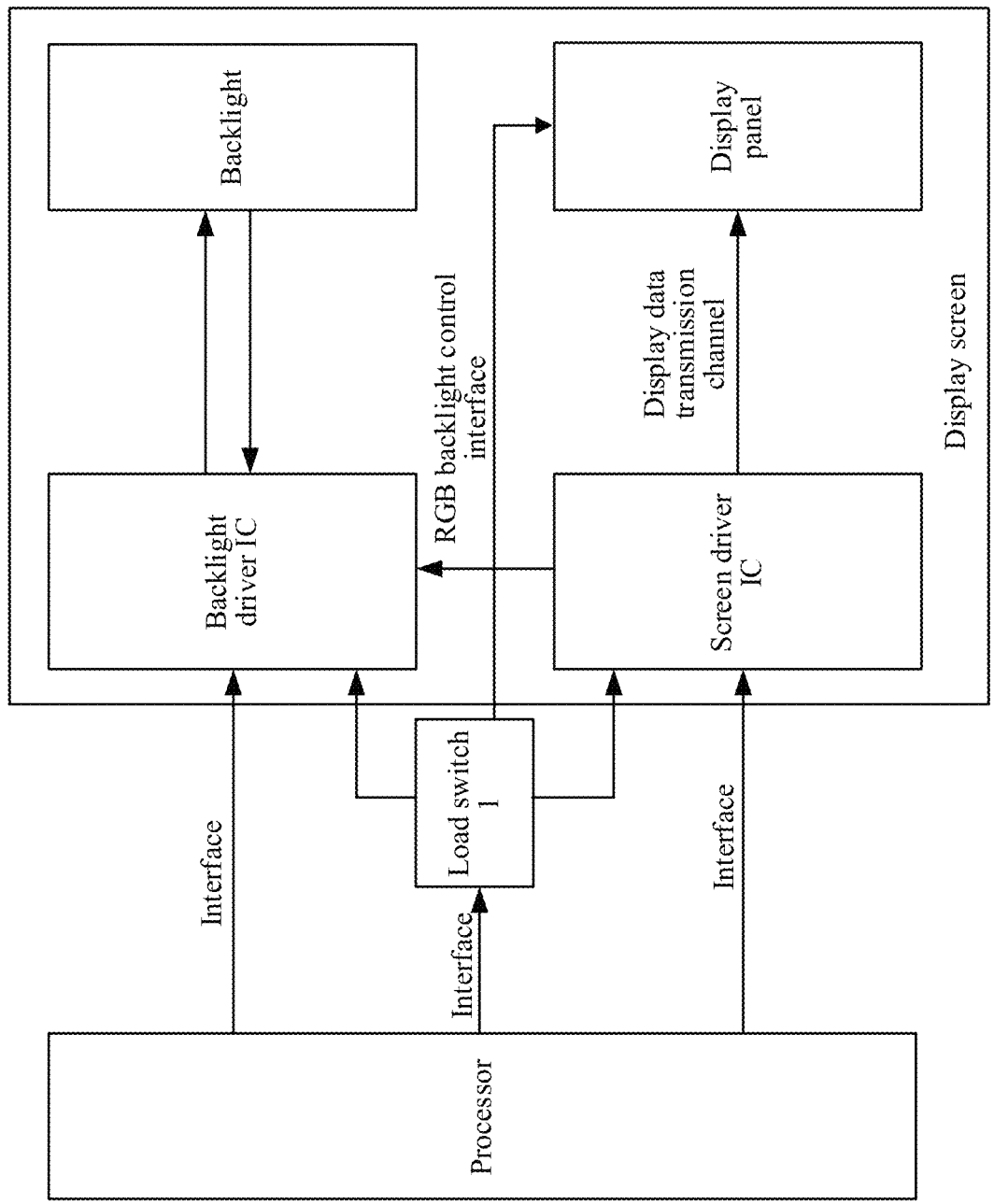
FIG. 9a and FIG. 9b are respectively schematic structural diagrams of a display screen according to an embodiment of this application.
Figure 9B:
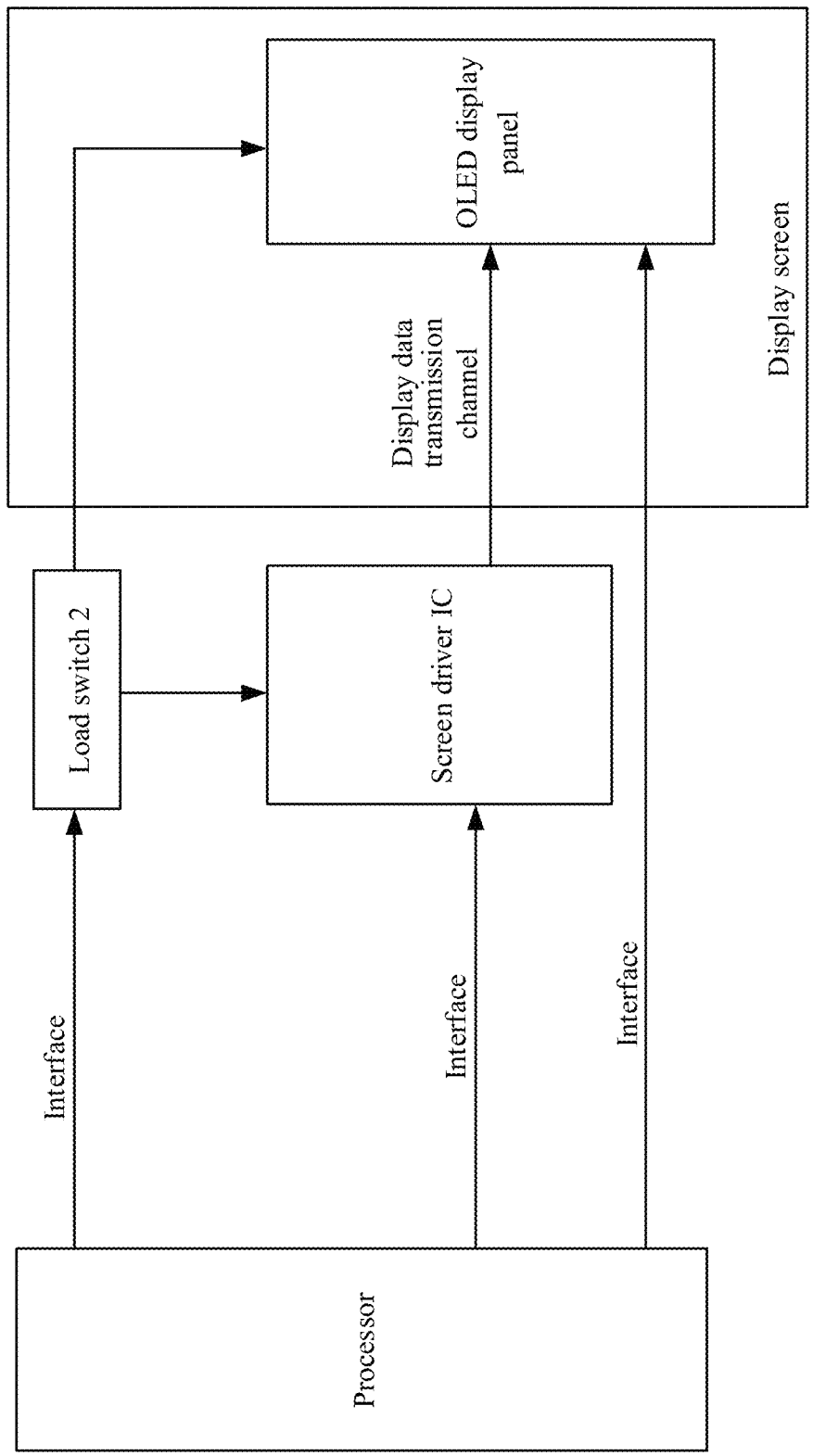

In this embodiment of this application, the display screen 1100 may be an LCD display screen or an OLED display screen. FIG. 9a and FIG. 9b are respectively schematic structural diagrams of a display screen according to an embodiment of this application. FIG. 9a is a schematic structural diagram of an LCD, and FIG. 9b is a schematic structural diagram of an OLED.

As shown in FIG. 9a, the LCD display screen includes a backlight, a display panel (panel), a backlight drive circuit (integrated circuit, IC), and a screen driver IC. The display panel is configured to provide different rotation directions of liquid crystal molecules, so as to achieve an objective of display by controlling exiting of polarized light of each pixel point.

The display panel includes a liquid crystal cell, a polarizer and the like. The liquid crystal cell includes liquid crystal molecules, and different rotation directions of the liquid crystal molecules have different polarizations of light, thereby implementing a bright or dark state of a pixel. The liquid crystal cell corresponding to each pixel of the display panel implements different liquid crystal rotation directions under control of the screen driver IC, so that light is transmitted or not transmitted through the display panel. The polarizer is configured to provide a specific polarization direction, and only allows light of which a polarization direction is in the specific direction to transmit through. Upper and lower sides of the liquid crystal cell may be respectively provided with the polarizer, so that the light of which the polarization direction is in the specific direction can transmit through the display panel. The upper and lower sides of the liquid crystal cell may include a side close to the backlight and a side close to the eye.

Because the liquid crystal in the display panel does not emit light, the backlight is needed to provide a light source for the display screen. The backlight may be implemented by a light emitting diode (LED). To achieve a color effect of the display screen, the backlight can display three colors including red green blue (RGB). Specifically, each pixel may include LEDs corresponding to the three colors. RGB colors of pixels may also be achieved by using a color filter and a white LED.

A backlight driver IC and the backlight form a loop, and the backlight driver IC is used to control the backlight to provide a light source for the display screen. The backlight driver IC may be connected to a processor interface and controlled by the processor to adjust a current of the backlight, so as to realize different backlight brightness. The processor may use a content adaptive brightness control (CABC) or ambient light sensing light adaptive brightness control (LABC) to control the current inputted to the backlight by the backlight driver IC.

The screen driver IC may receive display data transmitted by the processor interface, to drive the display panel and the backlight. The display data includes brightness data and color data of each pixel of the display panel. The screen driver IC drives, through a display data transmission channel by using the brightness data, the display panel to provide brightness corresponding to each pixel. The screen driver IC may be further connected to the backlight driver IC through an RGB backlight control interface. The screen driver IC drives, through the RGB backlight control interface by using the color data, the backlight driver IC and the backlight to provide a color corresponding to each pixel.

As shown in FIG. 9a, the LCD display screen may further include a load switch 1. The load switch 1 may perform one or more of the following operations under control of the processor: controlling the backlight driver IC to turn off or restore power supply to the backlight, controlling turning off or restoration of power supply to the display screen, controlling turning off or restoration of power supply to the backlight driver IC, and controlling turning off or restoration of power supply to the screen driver IC.

As shown in FIG. 9b, the OLED display screen includes an OLED display panel (panel) and a screen driver IC. The OLED display panel includes a plurality of display units arranged in an array. Each display unit may emit light under drive of the screen driver IC. The processor may control, through an interface, a current transmitted to the OLED display panel, to implement different backlight brightness. The processor may control, by using the CABC or the LABC, the current inputted to the OLED display panel.

The screen driver IC may receive display data transmitted by the processor interface, to drive the OLED display panel. The display data includes brightness data and color data of each pixel of the OLED display panel. The screen driver IC drives, by using the brightness data and the color data, the OLED display panel to provide brightness corresponding to each pixel.

As shown in FIG. 9b, the OLED display screen may further include a load switch 2. The load switch 2 may perform one or more of the following operations under control of the processor: controlling turning off or restoration of power supply to the OLED display panel, and controlling turning off or restoration of power supply to the screen driver IC.

In this embodiment of this application, the processor may be the processor 110 in the electronic device 100 described in FIG. 1. The above structural examples of the LCD display screen and the OLED display screen are only used to explain this embodiment of this application, and should not constitute a limitation. Both the LCD display screen and the OLED display screen may contain more or fewer parts, and may further contain different part arrangements.

The following describes an implementation of turning off the display of the display screen and an implementation of setting a focus on the display screen.

(1) Turn Off the Display of the Display Screen

In this embodiment of this application, for the LCD display screen, turning off the display of the display screen may include any one of the following situations: (1) turning off the power supply to the backlight of the display screen; (2) turning off the power supply to the backlight and the display panel of the display screen; and (3) turning off the power supply to the backlight of the display screen, the display panel, the screen driver IC and the backlight driver IC.

When the backlight driver IC is controlled to turn off the power supply to the backlight, the processor still sends the display data to the display panel through the screen driver IC and the backlight driver IC. However, because the backlight is turned off, the display screen cannot display an image. Because the display data is kept being sent to the display panel, a speed of restoring the power supply to the backlight is high.

When the power supply to the display panel is controlled to be turned off, the display panel cannot receive the display data sent by the screen driver IC, and initial configuration data of the display panel is lost. When the power supply to the display screen is restored, each pixel needs to be initialized (for example, some initial potential assignment). Therefore, a speed of restoring the display of the display screen is low, which can save power consumption of the display panel. When a requirement for a response speed of restoring the display of the display screen is not high, the display panel may be turned off to further save the power consumption.

After the backlight driver IC is controlled to be turned off, the backlight driver IC cannot receive backlight data sent by the processor. The backlight driver IC cannot receive color data sent by the screen driver IC. When the power supply to the backlight driver IC is restored, similarly, the backlight driver IC needs to be initialized. When the power supply to the screen driver IC is controlled to be turned off, the screen driver IC cannot receive the display data sent by the processor, and cannot send the color data to the backlight driver IC. When the power supply to the screen driver IC is restored, similarly, the screen driver IC also needs to be initialized. Therefore, a speed of restoring the display of the display screen is low.

In this embodiment of this application, for the OLED display screen, turning off the display of the display screen may include any one of the following situations: (1) turning off the power supply to the OLED display panel; and (2) turning off the power supply to the OLED display panel and the screen driver IC.

When the processor controls the turning off of the power supply to the OLED display panel, the processor still sends the display data to the screen driver IC. However, because the power supply to the OLED display panel is turned off, the OLED display screen cannot display an image. When the power supply to the display screen is restored, each pixel needs to be initialized (for example, some initial potential assignment). Because the display data is kept being sent to the OLED display panel, a speed of restoring the power supply to the OLED display panel is high.

When the power supply to the screen driver IC is controlled to be turned off, the screen driver IC cannot receive the display data sent by the processor, and cannot send the display data to the OLED display panel. When the power supply to the screen driver IC is restored, similarly, the screen driver IC also needs to be initialized. A speed of restoring the power supply to the screen driver IC is low.

In addition, the processor may control the power supply to pixels in some areas of the OLED display panel to be turned off. No image can be displayed in the areas. Therefore, the display of some areas on the display screen can be turned off.

(2) Set a Focus on the Display Screen

An image displayed on the display screen may form a virtual image in the eye of the user. A focus corresponding to the virtual image may be set within a certain distance, for example, two meters or four meters, in front of the eye of the user through an optical design of the display screen. The distance may further be a distance interval, for example, two to four meters. In this case, an image displayed on the display screen appears to be imaged on the fixed focus in front of the eye of the user.

According to some embodiments shown in FIG. 1 to FIG. 3-1 and FIG. 3-2, FIG. 4*a* to FIG. 4*k*-1 and FIG. 4*k*-2, FIG. 5-1 and FIG. 5-2 to FIG. 8, FIG. 9*a*, and FIG. 9*b*, the following describes a method for controlling a display screen according to an eye focus provided by an embodiment of this application.

Figure 10:
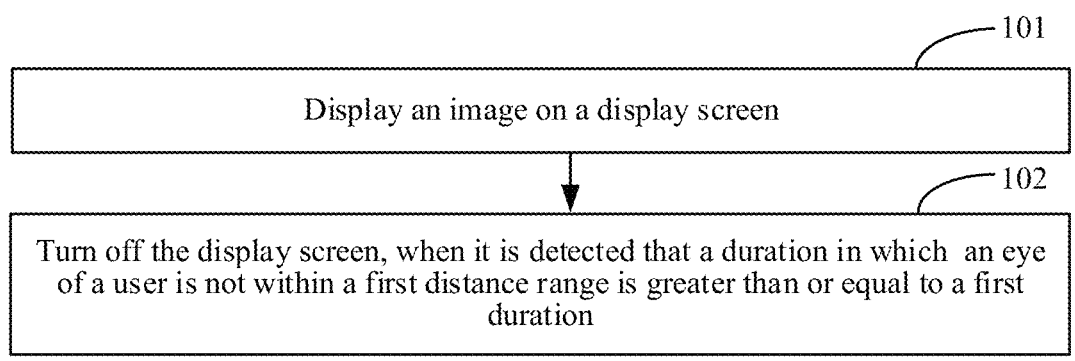
FIG. 10 is a schematic flowchart of a method for controlling a display screen according to an eye focus according to an embodiment of the present invention.

Refer to FIG. 10. FIG. 10 is a schematic flowchart of a method for controlling a display screen according to an eye focus according to an embodiment of the present invention. As shown in FIG. 10, the method is applicable to a head-mounted electronic device. The head-mounted electronic device includes a display screen, and the display screen is transparent when display is turned off. The head-mounted electronic device may be the head-mounted electronic device shown in FIG. 1. The method includes the following steps.

S101. Display an image on the display screen.

An eye focus of a user is within a first distance range. For the first distance range, reference may be made to the related descriptions of the fixed focus shown in FIG. 3*a* in FIG. 3-1 and FIG. 3-2. The first distance range may be a distance range in front of an eye of a user 200, for example, a range of two to four meters in front of the eye of the user 200.

In this embodiment of this application, the display screen may be alternatively replaced by a projection system in the head-mounted electronic device, to form an image in the eye.

S102. Turn off the display screen, when it is detected that a duration in which the eye focus of the user is not within the first distance range is greater than or equal to a first duration.

For the first duration, reference may be made to the related description of being beyond the fixed focus shown in FIG. 3*b* in FIG. 3-1 and FIG. 3-2. The first duration may be, for example, one minute.

In some possible embodiments, after the step S102, when it is detected that a duration in which the eye focus of the user falls within the first distance range is greater than or equal to a second duration, the display screen is turned on.

For the second duration, reference may be made to the related description of returning to the fixed focus shown in FIG. 3*c* in FIG. 3-1 and FIG. 3-2. The second duration may be, for example, one second.

In some possible embodiments, the display screen is a liquid crystal display screen. When a video is played on the display screen, the turning off the display screen includes: turning off a backlight of the display screen.

In some other possible embodiments, the display screen is a liquid crystal display screen. When navigation information is displayed on the display screen, the turning off the display screen includes: turning off the backlight of the display screen and one or more of the followings: a display panel, a drive circuit of the backlight, and a drive circuit of the display screen.

For descriptions of the liquid crystal display, the display panel, the drive circuit of the backlight, and the drive circuit of the display screen, reference may be made to the specific descriptions of the LCD display screen shown in FIG. 9*a*. Details are not described herein again.

In some possible embodiments, the display screen is an organic light emitting diode display screen. When a video is played on the display screen, the turning off the display screen includes: turning off the display panel of the display screen.

In some other possible embodiments, the display screen is an organic light emitting diode display screen. When navigation information is displayed on the display screen, the turning off the display screen includes: turning off the drive circuit of the display screen and the display panel of the display screen.

For specific descriptions of the OLED display screen, the OLED display panel, and the drive circuit, reference may be made to the specific descriptions of the OLED display screen shown in FIG. 9*b*. Details are not described herein again.

In some possible embodiments, when any one or more of the followings are detected, the display screen is turned off: the duration in which the eye focus of the user is not within the first distance range being greater than or equal to the first duration; an operation of pressing a first key; a first gesture; and a first speech signal.

For the first key, reference may be made to the related descriptions of the first key in FIG. 4*g*. For the first gesture, reference may be made to the related descriptions of the first gesture in FIG. 4g. The first gesture may be, for example, one or more of the following gestures: a "v" gesture, a fist, a finger snap, or an OK gesture, and the like. For the first speech signal, reference may be made to the related descriptions of the first speech signal in FIG. 4h.

Further, a correspondence between the first key and an instruction of turning off the display screen may be preset by a system, or may be set in response to a user operation. Reference may be made to the related descriptions in FIG. 4i for details. A setting interface shown in FIG. 4i may further be displayed on an electronic device such as a mobile phone connected to the head-mounted electronic device.

In some possible embodiments, when any one or more of the followings are detected, the display screen is turned on: the duration in which the eye focus of the user falls within the first distance range being greater than or equal to the second duration; an operation of pressing a second key; a second gesture; and a second speech signal.

For the second key, reference may be made to the related descriptions of the second key in FIG. 4g. The first key and the second key may be the same or different. For the second gesture, reference may be made to the related descriptions of the second gesture in FIG. 4e. The first gesture and the second gesture may be the same or different.

Further, a correspondence between the second key and an instruction of turning on the display screen may be preset by the system, or may also be set in response to a user operation. Reference may be made to the related descriptions in FIG. 4i for details. A setting interface shown in FIG. 4i may further be displayed on an electronic device such as a mobile phone connected to the head-mounted electronic device.

In the foregoing steps S101 to S102, when the eye focus of the user is not in the fixed focus of the display screen, the display screen is turned off. The user may watch the entity object through the transparent display screen. In this way, impacts of a displayed image on watching the real world by the user can be reduced. In addition, the power consumption of the display screen can be reduced. When the eye focus of the user is within the fixed focus of the display screen, the display screen is turned on. In this way, operation convenience of the head-mounted electronic device can be improved.

When watching a video, if the user needs to watch an entity object, the video playing is paused, and the display of the first area on the display screen is turned off, thereby reducing power consumption and improving convenience for the user to watch the video. In addition, the display panel is turned off without turning off a screen driver IC; and the screen driver IC does not need to be initialized when the video playing is restored, so that a response speed of playing restoring can be improved.

The user operation may also be a touch operation on the display screen or a brainwave signal. The head-mounted electronic device may also turn on or turn off the display of the display screen when it is detected, by using a camera, that the eye is in a specific state, for example, the eye is upturned, downturned, or blinked quickly.

Optionally, when navigation information is displayed on the display screen, the head-mounted electronic device may further detect, by using a speed sensor, that a moving speed exceeds a speed threshold, and turn off the display of the display screen, or may move the navigation information displayed on the display screen to a side of the display screen. The display screen is turned off when it is detected that the moving speed of the head-mounted electronic device is excessively high. Therefore, a case that the safety of the user affected by the image displaying of the display screen when the user moves too fast in a navigation scenario can be reduced, thereby providing convenience for the user.

Optionally, when the navigation information is displayed on the display screen, the head-mounted electronic device may further determine, according to a location of the device, that there is no intersection within a distance threshold range in a movement direction along a current travel route, for example, there is no intersection within one kilometer, then the head-mounted electronic device may turn off the display of the display screen. In the navigation scenario, when an intersection to which the user needs to pay attention is not approached, the display of the display screen is turned off, thereby reducing power consumption of the head-mounted electronic device, and reducing a case that a line of sight of the user being blocked by the displayed image on the display screen, providing convenience for the user.

Optionally, to reduce a quantity of times that the display screen is repeatedly turned off or turned on, the electronic device may turn off the display panel and the driver IC when it is detected that none of images of N consecutive entity objects on the display screen is focused by the eye. Then, the display screen and the driver IC are turned on only when one or more of the followings are detected, to display an image of an entity object in a current viewing angle of the electronic device: a. the eye focus being focused in the fixed focus of the display screen; b. response to a certain user operation; and c. M (an integer greater than 1) entity objects successively entering the viewing angle of the electronic device.

In a navigation scenario, the backlight, the display panel, and the driver IC of the display screen may all be turned off to further reduce the power consumption.

Optionally, the head-mounted electronic device may further acquire, through machine learning, a quantity of times or a probability of an image corresponding to a different entity object being historically focused by the user. The head-mounted electronic device may determine, according to a quantity of times or a probability of each type of entity objects being historically focused, a triggering condition for turning off the display screen. The larger the quantity of times or the probability is, the looser the triggering condition set for turning off the display screen for the entity object can be. For example, the smaller the value of the first threshold is, the larger the values of the second threshold and the first duration are.

According to the foregoing method, display content on the display screen preferred by the user is determined through machine learning, and then a condition for turning off the display screen is set according to the display content on the display screen preferred by the user. In addition to reducing the power consumption, whether the user needs to turn off the display screen can be determined more precisely.

Optionally, the head-mounted electronic device may acquire, through machine learning, a quantity of times or a frequency of an image corresponding to a different scenario being historically focused by the user. The head-mounted electronic device may determine, according to a quantity of times or a frequency of an entity object being historically focused in each scenario, a triggering condition for turning off the display screen. The larger the quantity of times or the frequency is, the looser the triggering condition set for turning off the display screen in the scenario can be. For example, the smaller the value of the first threshold is, the larger the values of the second threshold and the first duration are.

According to the foregoing method, a display scenario on the display screen preferred by the user is determined through machine learning, and then a condition for turning off the display screen is set according to the display scenario on the display screen preferred by the user. In addition to reducing the power consumption, whether the user needs to turn off the display screen can be determined more precisely.

It may be understood that for specific implementations of the steps of the method in FIG. 10, reference may be made to the foregoing embodiments in FIG. 1 to FIG. 3-1 and FIG. 3-2, FIG. 4a to FIG. 4k-1 and FIG. 4k-2, FIG. 5-1 and FIG. 5-2 to FIG. 8, FIG. 9a, and FIG. 9b. Details are not described herein again.

The implementation of this application may be randomly combined to achieve different technical effects.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk), or the like.

In short, the foregoing descriptions are only embodiments of the technical solutions of the present invention, but are not intended to limit the protection scope of the present invention. Any modification, equivalent substitution, and improvement made according to the disclosure of the present invention shall fall within the protection scope of the present invention.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A method for controlling a display screen according to eye focus of a user, comprising:
    displaying an image on the display screen, wherein an eye focus of the user being within a first distance range of the display screen, the display screen comprised in a head-mounted electronic device and the display screen being transparent when the display screen is turned off;
    turning off the display screen in response to detecting that a frequency at which the eye focus of the user during a predetermined period of time is beyond a fixed focus of the display screen is greater than a first frequency threshold, wherein a screen driver integrated circuit of the display screen remains on after the display screen is turned off; and
    in response to detecting that a frequency at which the eye focus of the user falls on the fixed focus of the display screen is greater than a second frequency threshold, turning on the display screen, without initializing the screen driver integrated circuit, to restore the display of the image on the display screen.

2. The method according to claim 1, wherein the display screen is a liquid crystal display, and when a video is played on the display screen, the turning off the display screen comprises:
    turning off a backlight of the display screen.

3. The method according to claim 1, wherein the display screen is a liquid crystal display, and when navigation information is displayed on the display screen, the turning off the display screen comprises:
    turning off a backlight of the display screen and one or more of: a display panel, a drive circuit of the backlight, and a drive circuit of the display screen.

4. The method according to claim 1, wherein the display screen is an organic light emitting diode display screen, and when a video is played on the display screen, the turning off the display screen comprises:
    turning off a display panel of the display screen.

5. The method according to claim 1, wherein the display screen is an organic light emitting diode display screen, and when navigation information is displayed on the display screen, the turning off the display screen comprises:
    turning off a drive circuit of the display screen and a display panel of the display screen.

6. The method according to claim 1, further comprising:
    turning off the display screen in response to detecting one or more of:
        a duration in which the eye focus of the user is not within a first distance range being greater than or equal to a first duration,
        an operation of pressing a first key,
        a first gesture, and
        a first speech signal.

7. The method according to claim 1, wherein the method further comprises:
    turning on the display screen in response to detecting one or more of:
        a duration in which the eye focus of the user falls within a first distance range being greater than or equal to a second duration,
        an operation of pressing a second key,
        a second gesture, and
        a second speech signal.

8. The method of claim 1, wherein turning off the display screen comprises:
    turning off a first portion of the display screen corresponding to an area of a projection of an eye of the user on the display screen at a viewing angle at which the eye focus is beyond the fixed focus of the display screen, wherein a second portion of the display screen not in the area of projection remains on.

9. The method of claim 8, further comprising:
    displaying the image at the second portion of the display screen while the first portion of the display screen is turned off, the second portion of the display screen outside of the area of the projection of the eye of the user on the display screen; and turning on first portion of the display screen restoring the display of the image at the first portion of the display screen in response to the detection of the frequency at which the eye focus of the user falls on the fixed focus of the display screen is greater than the second frequency threshold.

10. The method of claim 1, wherein the image is a video, pausing the video when the display screen is turned off, the video paused at a point in time of the video; and restoring the display of the video on the display screen at the point in time when the display screen is turned on.

11. A head-mounted electronic device, comprising:
one or more processors; and
one or more memories coupled to the one or more processors, the one or more memories are configured to store a computer program code, the computer program code comprises computer instructions, and when the one or more processors execute the computer instructions, a terminal executes operations for controlling a display screen according to eye focus of a user, the operations comprising:
displaying an image on the display screen, wherein an eye focus of the user being within a first distance range of the display screen, the display screen comprised in the head-mounted electronic device and the display screen being transparent when the display screen is turned off;
turning off the display screen in response to detecting that a frequency at which the eye focus of the user during a predetermined period of time is beyond a fixed focus of the display screen is greater than a first frequency threshold, wherein a screen driver integrated circuit of the display screen remains on after the display screen is turned off; and
in response to detecting that a frequency at which the eye focus of the user falls on the fixed focus of the display screen is greater than a second frequency threshold, turning on the display screen, without initializing the screen driver integrated circuit, to restore the display of the image on the display screen.

12. The device according to claim 11, wherein the display screen is a liquid crystal display, and when a video is played on the display screen, the turning off the display screen comprises:
turning off a backlight of the display screen.

13. The device according to claim 11, wherein the display screen is a liquid crystal display, and when navigation information is displayed on the display screen, the turning off the display screen comprises:
turning off a backlight of the display screen and one or more of the followings: a display panel, a drive circuit of the backlight, and a drive circuit of the display screen.

14. The device according to claim 11, wherein the display screen is an organic light emitting diode display screen, and when a video is played on the display screen, the turning off the display screen comprises:
turning off a display panel of the display screen.

15. The device according to claim 11, wherein the display screen is an organic light emitting diode display screen, and when navigation information is displayed on the display screen, the turning off the display screen comprises:
turning off a drive circuit of the display screen and a display panel of the display screen.

16. A non-transitory computer storage medium, comprising computer instructions, the computer instructions, when running on a terminal, causing the terminal to execute operations for controlling a display screen according to eye focus of a user, the operations comprising:
displaying an image on the display screen, wherein an eye focus of the user being within a first distance range of the display screen, the display screen comprised in a head-mounted electronic device and the display screen being transparent when the display screen is turned off;
turning off the display screen in response to detecting that a frequency at which the eye focus of the user during a predetermined period of time is beyond a fixed focus of the display screen is greater than a first frequency threshold, wherein a screen driver integrated circuit of the display screen remains on after the display screen is turned off; and
in response to detecting that a frequency at which the eye focus of the user falls on the fixed focus of the display screen is greater than a second frequency threshold, turning on the display screen, without initializing the screen driver integrated circuit, to restore the display of the image on the display screen.

17. The non-transitory computer storage medium according to claim 16, wherein the display screen is a liquid crystal display, and when a video is played on the display screen, the turning off the display screen comprises:
turning off a backlight of the display screen.

18. The non-transitory computer storage medium according to claim 16, wherein the display screen is a liquid crystal display, and when navigation information is displayed on the display screen, the turning off the display screen comprises:
turning off a backlight of the display screen and one or more of: a display panel, a drive circuit of the backlight, and a drive circuit of the display screen.

19. The non-transitory computer storage medium according to claim 16, wherein the display screen is an organic light emitting diode display screen, and when a video is played on the display screen, the turning off the display screen comprises:
turning off a display panel of the display screen.

20. The non-transitory computer storage medium according to claim 16, wherein the display screen is an organic light emitting diode display screen, and when navigation information is displayed on the display screen, the turning off the display screen comprises:
turning off a drive circuit of the display screen and a display panel of the display screen.

* * * * *